US012334652B2

(12) United States Patent
Sunahara

(10) Patent No.: US 12,334,652 B2
(45) Date of Patent: Jun. 17, 2025

(54) ANTENNA DEVICE

(71) Applicant: Murata Manufacturing Co., Ltd., Nagaokakyo (JP)

(72) Inventor: Minoru Sunahara, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 189 days.

(21) Appl. No.: 18/339,582

(22) Filed: Jun. 22, 2023

(65) Prior Publication Data

US 2023/0344130 A1 Oct. 26, 2023

Related U.S. Application Data

(63) Continuation of application No. PCT/JP2021/036770, filed on Oct. 5, 2021.

(30) Foreign Application Priority Data

Dec. 23, 2020 (JP) ................................ 2020-214209

(51) Int. Cl.
*H01Q 1/32* (2006.01)
*H01Q 7/08* (2006.01)

(52) U.S. Cl.
CPC .................................... *H01Q 7/08* (2013.01)

(58) Field of Classification Search
CPC .......... H01Q 7/08; H01Q 1/3241; H01Q 1/32; H01Q 1/27
See application file for complete search history.

(56) References Cited

U.S. PATENT DOCUMENTS 3,778,836 A * 12/1973 Tanaka ..................... H01Q 1/24 343/788
2002/0033777 A1* 3/2002 Maruyama ............... H01Q 1/40 343/788
2005/0219139 A1* 10/2005 Kimura .................... H01Q 7/08 343/788
2007/0091007 A1* 4/2007 Sako ........................ H01Q 7/08 343/788
(Continued)

FOREIGN PATENT DOCUMENTS

JP S60203002 A 10/1985
JP H06013213 U 2/1994
(Continued)

OTHER PUBLICATIONS

International Search Report in PCT/JP2021/036770, mailed Dec. 21, 2021, 4 pages.

*Primary Examiner* — Awat M Salih
(74) *Attorney, Agent, or Firm* — ArentFox Schiff LLP

(57) ABSTRACT

An antenna device includes an antenna body and a case that accommodates the antenna body. The antenna body includes a bobbin including a pair of side walls that extend in a first direction with inner surfaces that face each other in a second direction crossing the first direction. A winding is wound around the bobbin to surround the side walls while the axial direction is parallel to the first direction. A core is held by the side walls between the inner surfaces of the pair of side walls in an inner space defined by the winding. At least one of the inner surfaces includes inclined surfaces that overlaps the core in a third direction crossing both the first and second directions so as to be positioned closer to the core.

20 Claims, 15 Drawing Sheets

(56) References Cited

U.S. PATENT DOCUMENTS

| | | | | |
|---|---|---|---|---|
| 2016/0315389 | A1* | 10/2016 | Imai | H01Q 1/3241 |
| 2017/0301995 | A1* | 10/2017 | Tanaka | H01Q 1/2208 |
| 2020/0136254 | A1 | 4/2020 | Suzuki | |

FOREIGN PATENT DOCUMENTS

| | | | |
|---|---|---|---|
| JP | 2012204959 | A | 10/2012 |
| WO | 2018216453 | A1 | 11/2018 |

* cited by examiner

70

ANTENNA DEVICE

CROSS REFERENCE TO RELATED APPLICATIONS

This application is a continuation of PCT Application No. PCT/JP2021/036770, filed Oct. 5, 2021, which claims priority to Japanese Patent Application No. 2020-214209, filed Dec. 23, 2020, the entire contents of each of which are hereby incorporated by reference in their entirety.

TECHNICAL FIELD

The present disclosure relates to antenna devices, and more particularly to an antenna device including a core that is held by a bobbin so as to be located inside a winding.

BACKGROUND

Japanese Unexamined Patent Application Publication No. 2012-204959 (hereinafter "Patent Document 1") discloses a vehicle-mounted antenna device as an example of an antenna device. As described therein, the vehicle-mounted antenna device includes an antenna assembly and a case. The antenna assembly is integrally formed of a bobbin, a core supported by the bobbin along a longitudinal direction, a coil wound around the core, a capacitor, and first and second connector connection terminals.

In such an antenna device as described in Patent Document 1, if a case receives an impact, the impact will be transmitted from the case to a bobbin and from the bobbin to a core, which may result in breakage of the core.

SUMMARY OF THE INVENTION

Accordingly, the exemplary embodiments of the present disclosure provide an antenna device configured to reduce an impact that acts on a core.

In an exemplary aspect, an antenna device is provided that includes an antenna body and a case in which the antenna body is accommodated. The antenna body includes a bobbin, a winding, and a core. The bobbin extends in a first direction and includes a pair of side walls that each have inner surfaces that face each other in a second direction crossing (e.g., intersecting) the first direction. The winding is wound around the bobbin in such a manner as to collectively surround the pair of side walls while an axial direction of the winding is parallel to the first direction. The core is held by the pair of side walls in such a manner as to be located between the inner surfaces of the pair of side walls in an inner space defined by the winding. At least one of the inner surfaces of the pair of side walls includes an inclined surface. The inclined surface overlaps the core in a third direction in such a manner as to be positioned closer to the core than the winding, the third direction crossing (e.g., intersecting) both the first direction and the second direction, and the inclined surface being inclined such that a distance from the core to the inclined surface in the third direction increases as a distance from the core to the inclined surface in the second direction decreases.

According to exemplary aspects of the present disclosure, an impact that acts on a core is reduced.

DETAILED DESCRIPTION OF EMBODIMENTS

Figure 1:
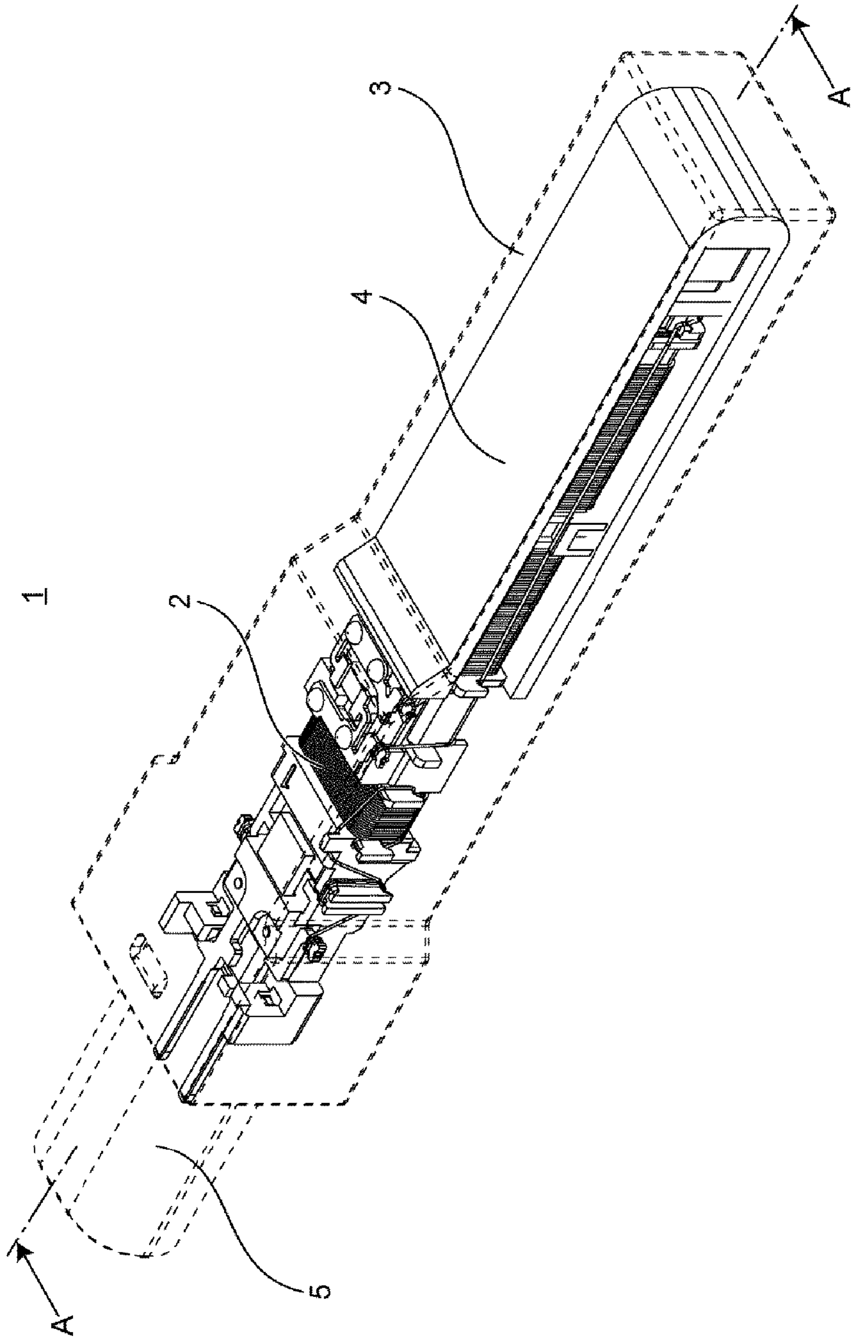
FIG. 1 is a perspective view illustrating a configuration example of an antenna device according to an exemplary embodiment.

An exemplary embodiment will be described in detail below with reference to the drawings as necessary. However, unnecessary details in the description may be omitted. For example, detailed descriptions of well-known matters and redundant descriptions of substantially the same configurations may be omitted. This is to prevent the following description from being unnecessarily redundant and to help those skilled in the art comprehend the present disclosure. Note that the accompanying drawings and following description are provided by the inventor(s) to enable those skilled in the art to sufficiently understand the present disclosure, and the subject matter described in the claims is not intended to be limited to the accompanying drawings and the following description.

In general, it is also noted that positional relationships, such as the vertical positional relationship and the horizontal positional relationship, are based on the positional relationships illustrated in the drawings unless otherwise specified. The drawings that will be referred to in the following descriptions of the embodiment and modifications are schematic drawings, and the sizes and thicknesses of the components illustrated in the drawings are not always reflect the actual dimensional ratios. In addition, the dimensional ratios of the components are not limited to the ratios illustrated in the drawings.

(Exemplary Embodiment)

[1. Overview]

FIG. 1 is a perspective view illustrating a configuration example of an antenna device 1 according to an exemplary embodiment. In an exemplary aspect, the antenna device 1 illustrated in FIG. 1 is, for example, a vehicle-mounted antenna device. The antenna device 1 is mounted on, for example, a door, a console, a bumper, or the like of a vehicle in order to construct a keyless entry system.

Figure 2:
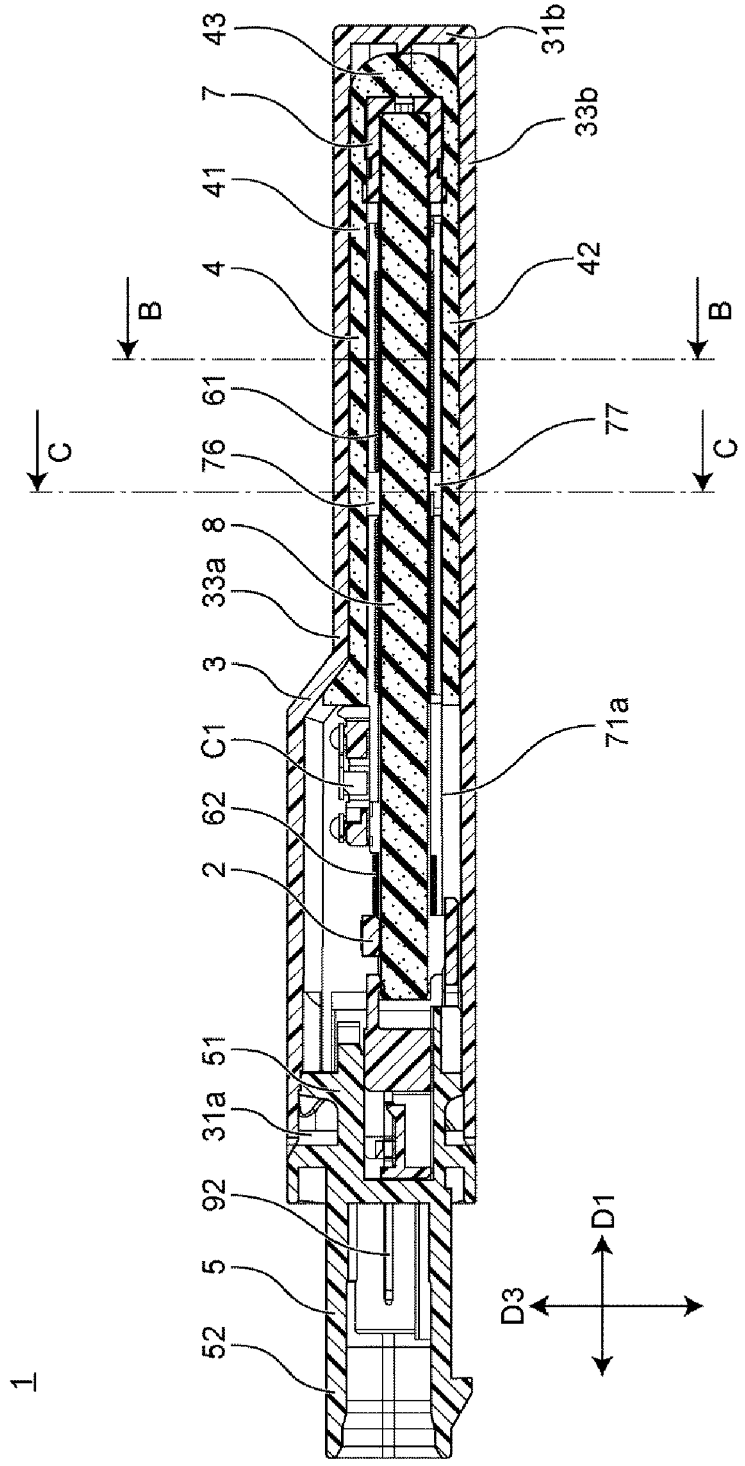
FIG. 2 is a sectional view taken along line A-A of FIG. 1.
Figure 3:
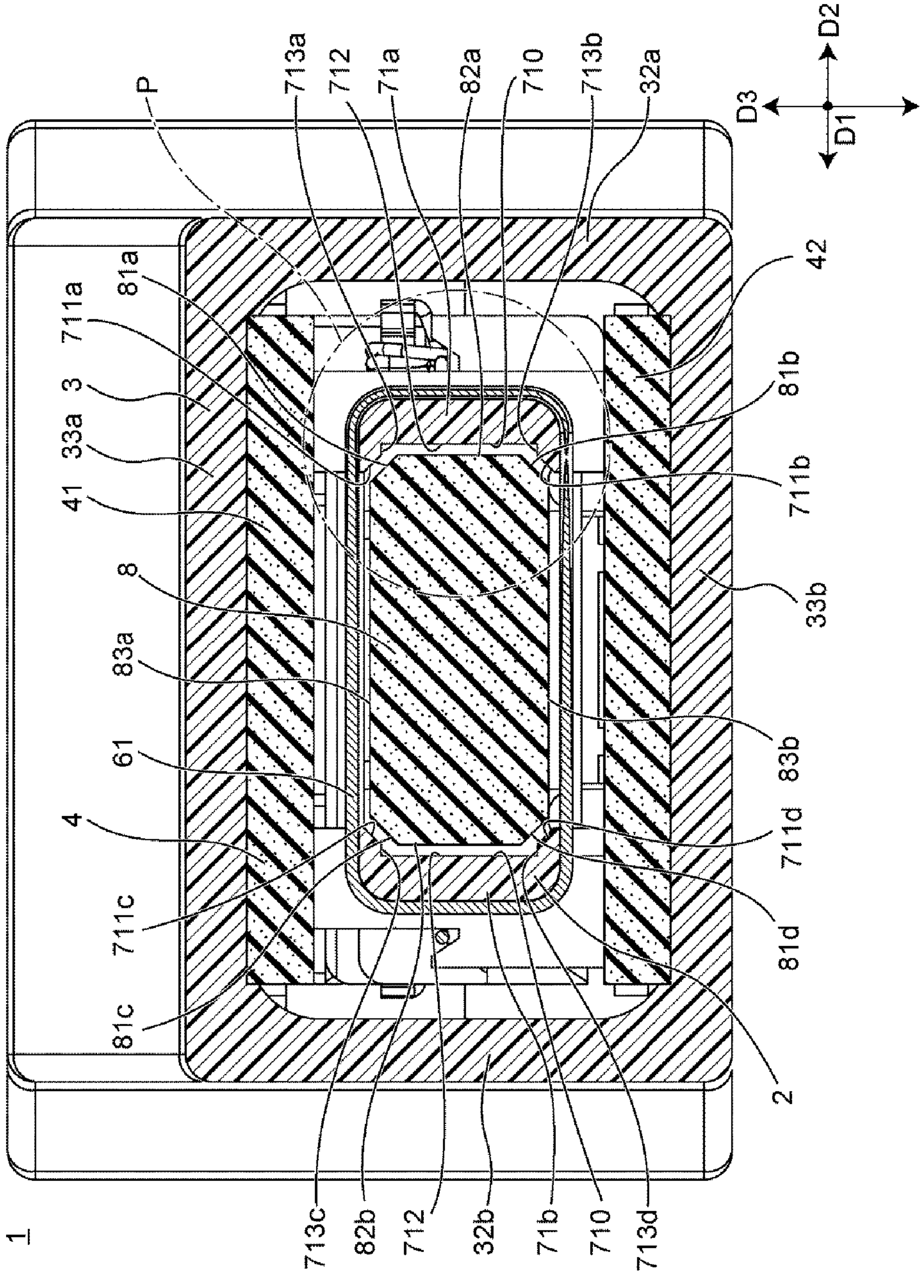
FIG. 3 is a cross-sectional view taken along line B-B of FIG. 2.
Figure 4:
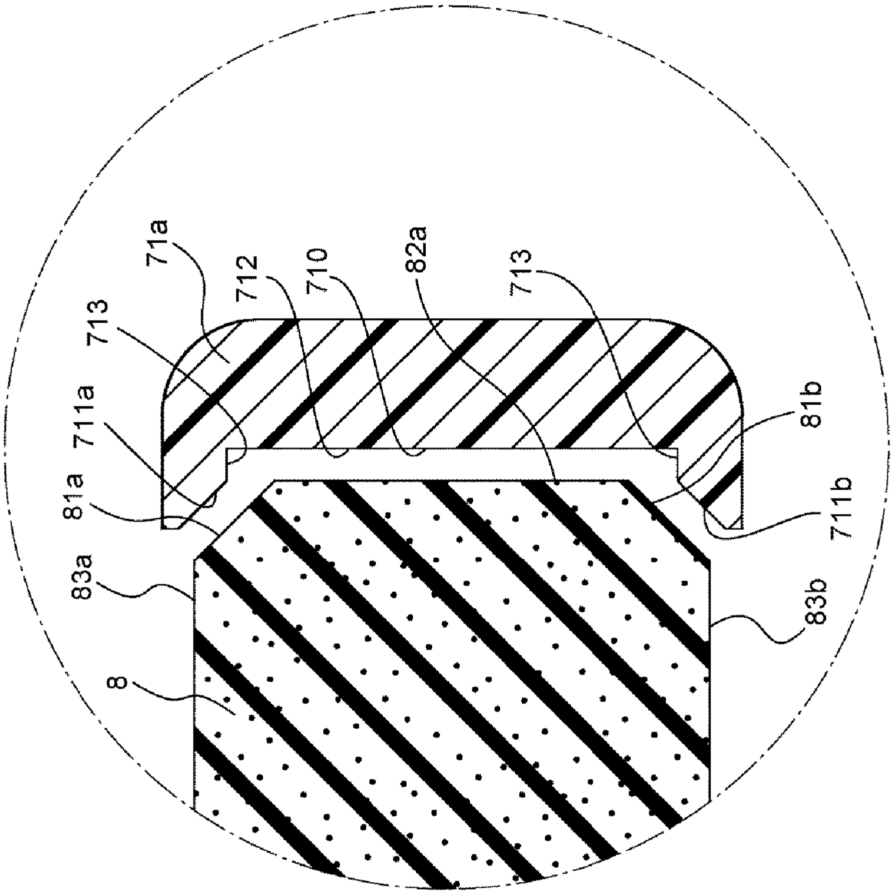
FIG. 4 is an enlarged view of a portion indicated by P in FIG. 3.
Figure 5:
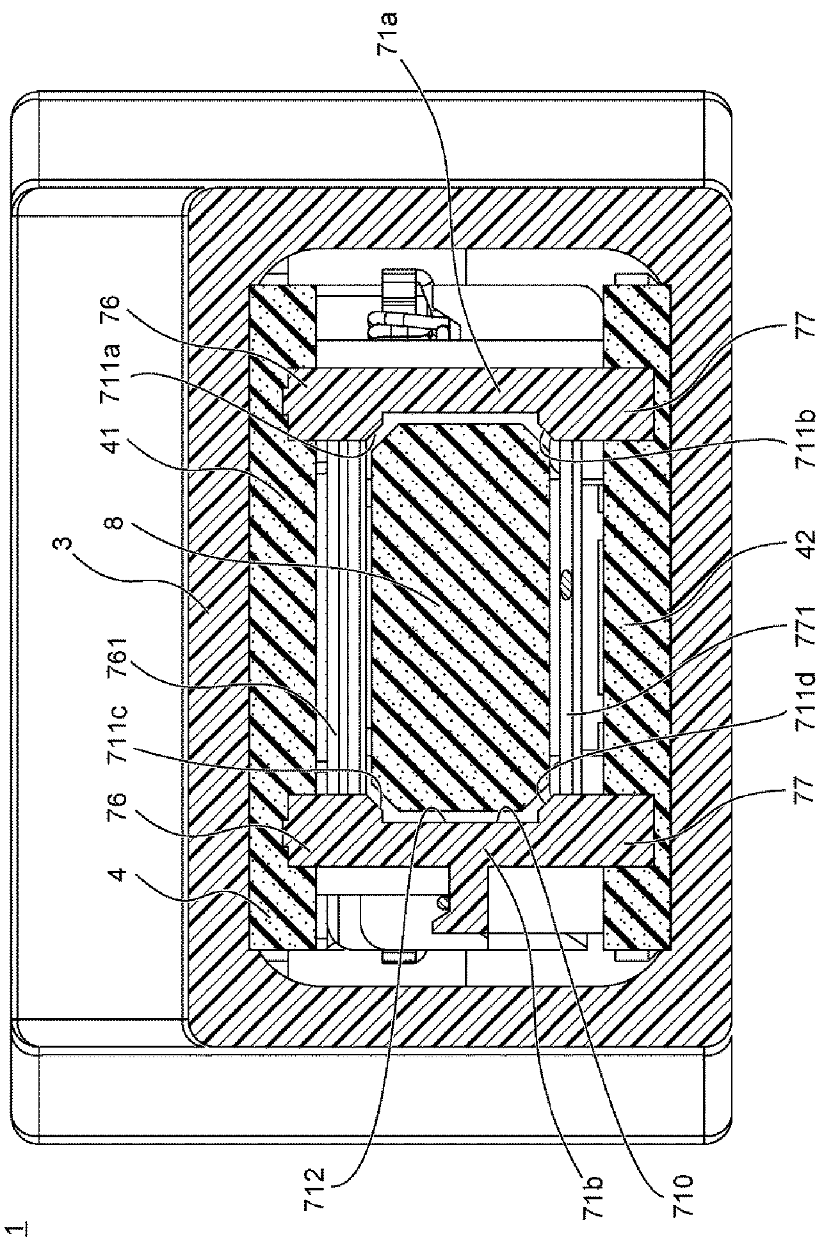
FIG. 5 is a cross-sectional view taken along line C-C of FIG. 2.

FIG. 2 is a sectional view taken along line A-A of FIG. 1. FIG. 3 is a cross-sectional view taken along line B-B of FIG. 2. FIG. 4 is an enlarged view of a portion indicated by P in FIG. 3. FIG. 5 is a cross-sectional view taken along line C-C of FIG. 2.

As illustrated in FIG. 1 and FIG. 2, the antenna device 1 includes an antenna body 2 and a case 3 in which the antenna body 2 is accommodated.

As illustrated in FIG. 2, the antenna body 2 includes a bobbin 7, a winding 61, and a core 8. As illustrated in FIG. 2 and FIG. 3, the bobbin 7 includes a pair of side walls 71*a* and 71*b* that extend in a first direction D1. As illustrated in FIG. 2 and FIG. 3, the pair of side walls 71*a* and 71*b* have inner surfaces 710 that face each other in a second direction D2 crossing (e.g., intersecting) the first direction D1. As illustrated in FIG. 2 and FIG. 3, the winding 61 is wound around the bobbin 7 in such a manner as to collectively surround the pair of side walls 71*a* and 71*b* while the axial direction thereof is parallel to the first direction D1. As illustrated in FIG. 2 and FIG. 3, the core 8 is held by the pair of side walls 71*a* and 71*b* so as to be located between the inner surfaces 710 of the pair of side walls 71*a* and 71*b* in an inner space defined by the winding 61. As illustrated in FIG. 3, the inner surfaces 710 of the pair of side walls 71*a* and 71*b* include inclined surfaces 711*a* to 711*d*. Each of the inclined surfaces 711*a* to 711*d* overlaps the core 8 in a third direction D3 crossing (e.g., intersecting) both the first direction D1 and the second direction D2 so as to be positioned closer to the core 8 than the winding 61 is. The inclined surfaces 711*a* to 711*d* are inclined such that their distance from the core 8 in the third direction D3 increases as their distance from the core 8 in the second direction D2 decreases.

In the antenna device 1, as illustrated in FIG. 3, the core 8 is located between the inner surfaces 710 of the pair of side walls 71*a* and 71*b* of the bobbin 7 and in the inner space defined by the winding 61. In the antenna device 1, if the case 3 receives an impact (e.g., from another object), this impact will be transmitted from the case 3 to the bobbin 7. After that, when the impact is transmitted from the bobbin 7 to the core 8, the inclined surfaces 711*a* to 711*d* of the bobbin 7 (instead of the winding 61) will come into contact with the core 8. The inclined surfaces 711*a* to 711*d* are inclined such that their distance from the core 8 in the third direction D3 increases as their distance from the core 8 in the second direction D2 decreases. Thus, the impact that is transmitted from the bobbin 7 to the core 8 is dispersed in the second direction D2 and the third direction D3, and this configuration can reduce the impact that acts on the core 8. Therefore, the probability of breakage of the core 8 is also reduced.

[2. Details]

The antenna device 1 according to the exemplary embodiment will be described in detail below.

Figure 6:
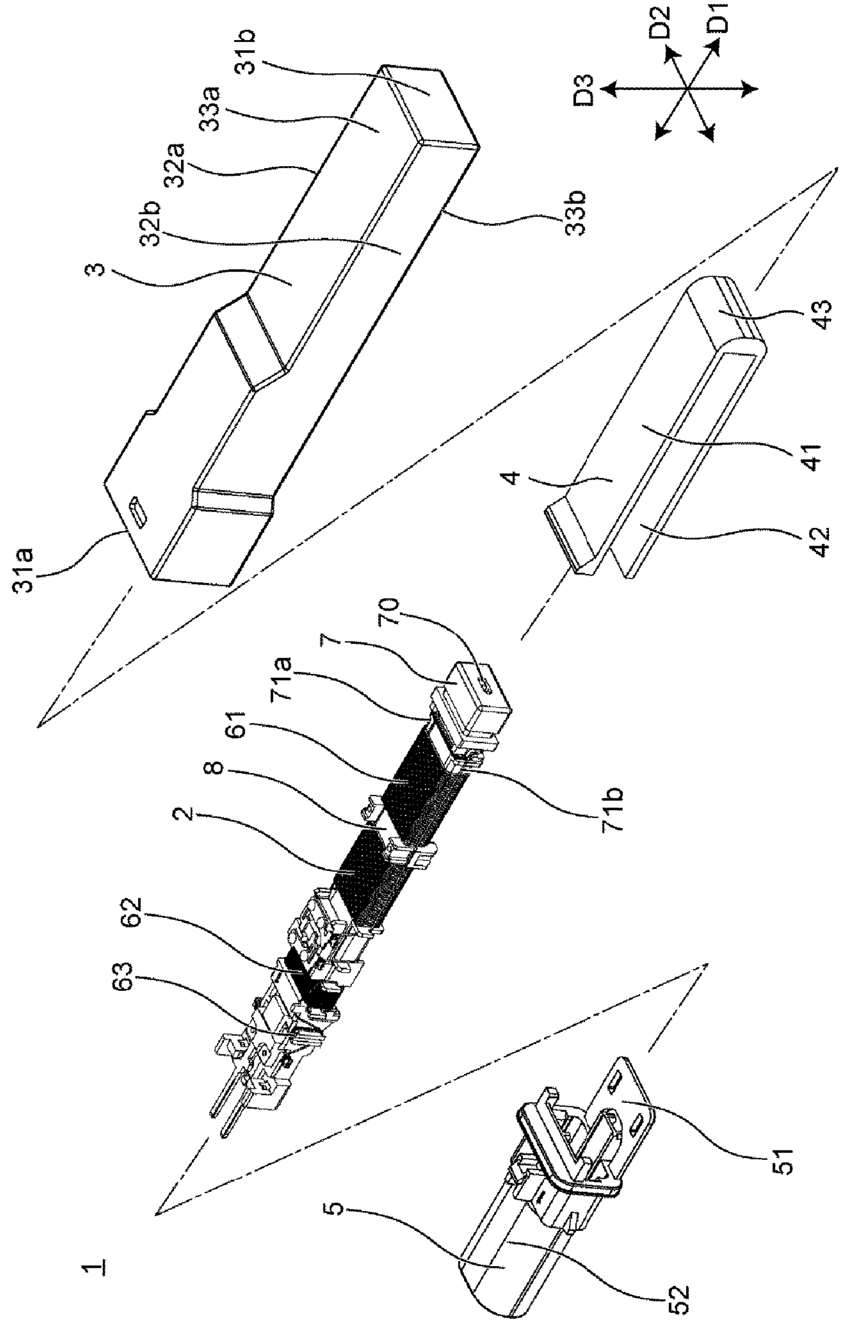
FIG. 6 is an exploded perspective view of the antenna device illustrated in FIG. 1.

FIG. 6 is an exploded perspective view of the antenna device 1. As illustrated in FIG. 6, the antenna device 1 includes the antenna body 2, the case 3, an elastic member 4, and a connector 5.

Figure 7:
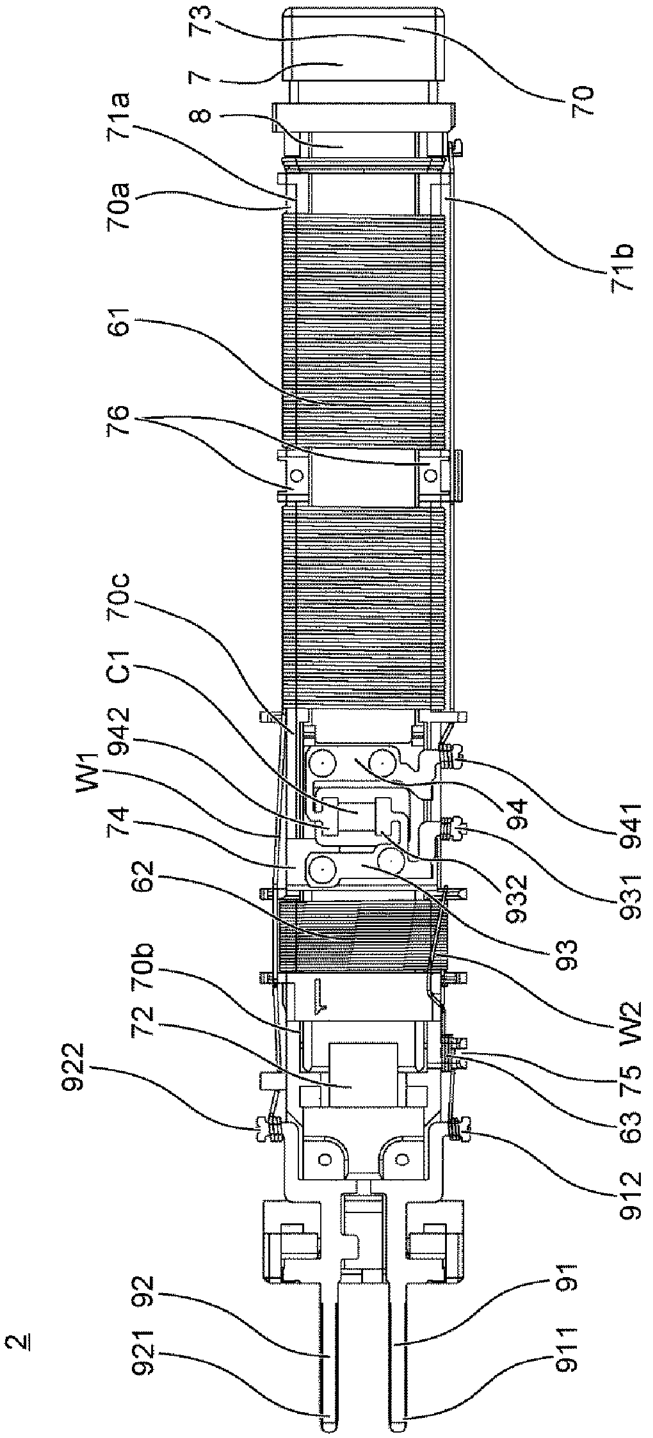
FIG. 7 is a plan view of an antenna body of the antenna device illustrated in FIG. 1.
Figure 8:
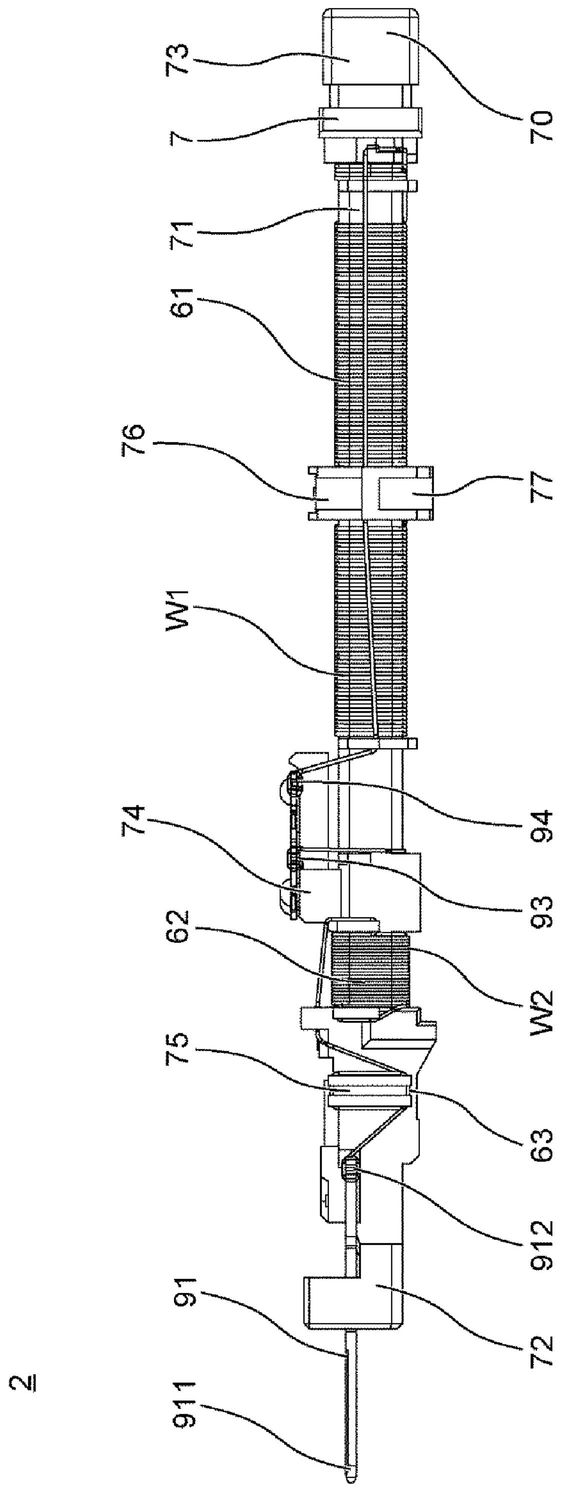
FIG. 8 is a side view of the antenna body of the antenna device illustrated in FIG. 1.

FIG. 7 is a plan view of the antenna body 2, and FIG. 8 is a side view of the antenna body 2. As illustrated in FIG. 7 and FIG. 8, the antenna body 2 includes the winding 61, a winding 62, a winding 63, the bobbin 7, the core 8, and a capacitor C1. The winding 61 forms a first inductor together with the core 8. The winding 62 forms a second inductor together with the core 8. The winding 63 alone forms a third inductor.

According to the exemplary aspect, the bobbin 7 is configured to hold the windings 61, 62, and 63, the core 8, and the capacitor C1. As illustrated in FIG. 7 and FIG. 8, the bobbin 7 having an elongated shape. The bobbin 7 includes a body 70 and first to fourth connection members 91 to 94. The body 70 is made of a non-magnetic resin material having an insulating property, for example. The first to fourth connection members 91 to 94 are fixed to the body 70.

Figure 9:
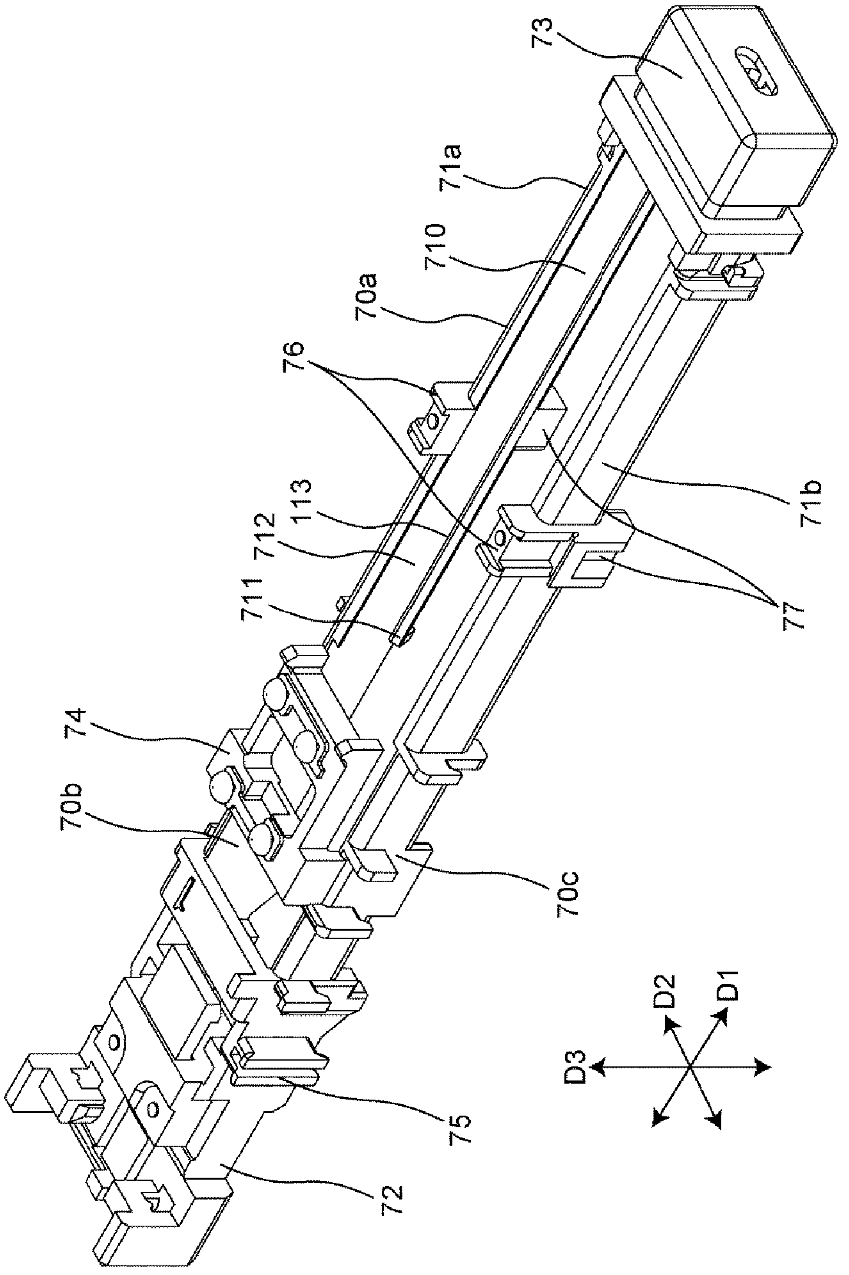
FIG. 9 is a perspective view of a body of a bobbin included in the antenna body of the antenna device illustrated in FIG. 1.

FIG. 9 is a perspective view of the body 70 of the bobbin 7. As illustrated in FIG. 9, the body 70 includes the pair of side walls 71*a* and 71*b*, a first end portion 72, a second end portion 73, a holding plate 74, a winding drum portion 75, a pair of protrusions 76, and a pair of protrusions 77. The pair of side walls 71*a* and 71*b*, the first end portion 72, the second end portion 73, the holding plate 74, the winding drum portion 75, the pair of protrusions 76, and the pair of protrusions 77 are continuously and integrally formed.

The pair of side walls 71*a* and 71*b* are included in a drum portion of the bobbin 7. The pair of side walls 71*a* and 71*b* are configured to hold the windings 61 and 62, the capacitor C1, and the core 8.

The pair of side walls 71*a* and 71*b* each have a long plate-like shape. As illustrated in FIG. 9, the pair of side walls 71*a* and 71*b* are divided into a first region 70*a*, a second region 70*b*, and a third region 70*c*. The first region 70*a* is a region located on a first end (i.e., the right end in FIG. 9) side of the pair of side walls 71*a* and 71*b*. The first region 70*a* is used for holding the winding 61 included in the first inductor. The second region 70*b* is a region located on a second end (i.e., the left end in FIG. 9) side of the pair of side walls 71*a* and 71*b*. The second region 70*b* is used for holding the winding 62 included in the second inductor. The third region 70*c* is a region located between the first region 70*a* and the second region 70*b* in the pair of side walls 71*a* and 71*b*. The third region 70*c* is configured to hold the capacitor C1.

The pair of side walls 71*a* and 71*b* extend in the first direction D1 and have the inner surfaces 710, which face each other in the second direction D2 crossing the first direction D1. In the present embodiment, the second direction D2 is perpendicular to the first direction D1. The first direction D1 is the lengthwise direction of the pair of side walls 71*a* and 71*b*. The second direction D2 is the thicknesswise direction of the pair of side walls 71*a* and 71*b*. In the third direction D1 crossing both the first direction D1 and the second direction D2, the pair of side walls 71*a* and 71*b* are each larger than the core 8. The dimension of each of the pair of side walls 71*a* and 71*b* in the third direction D3 is larger than the dimension of the core 8 in the third direction D3. In the present embodiment, the third direction D3 is perpendicular to the first direction D1 and to the second direction D2. The third direction D3 is the widthwise direction of the pair of side walls 71*a* and 71*b*.

The core 8 is accommodated in a space between the pair of side walls 71*a* and 71*b*. More specifically, the core 8 is held by the pair of side walls 71*a* and 71*b* so as to be located between the inner surfaces 710 of the pair of side walls 71*a* and 71*b*.

As illustrated in FIG. 2, the core 8 has a bar-like shape extending in the first direction D1. The core 8 has, for example, a rectangular columnar shape extending in the first direction D1. The dimension of the core 8 in the first direction D1 is approximately equal to the dimension of each of the pair of side walls 71*a* and 71*b* in the first direction D1. In other words, the core 8 extends across substantially the entire length of each of the pair of side walls 71*a* and 71*b*. Accordingly, as illustrated in FIG. 7, the core 8 is present in the first region 70*a*, the second region 70*b*, and the third region 70*c*. Thus, the core 8 is located in the inner space defined by the winding 61. The winding 61 forms the first inductor together with the core 8. The core 8 is located in the inner space defined by the winding 62. The winding 62 forms the second inductor together with the core 8.

As illustrated in FIG. 3, the core 8 has two side surfaces 82*a* and 82*b* (hereinafter sometimes collectively referred to as "side surfaces 82") in the second direction D2. The side surfaces 82*a* and 82*b* face the inner surface 710 of the side wall 71*a* and the inner surface 710 of the side wall 71*b*, respectively. The side surfaces 82*a* and 82*b* are flat surfaces that are parallel to each other. Moreover, the core 8 has two side surfaces 83*a* and 83*b* (hereinafter sometimes collectively referred to as "side surfaces 83") in the third direction D3. The side surfaces 83*a* and 83*b* are flat surfaces that are parallel to each other. The dimension of the core 8 in the third direction D3 is smaller than the dimension of the core 8 in the second direction D2. The core 8 includes four corner portions 81*a* to 81*d* (hereinafter sometimes collectively referred to as "corner portions 81") in a plane perpendicular to the first direction D1. The corner portions 81 face the inclined surfaces 711 of the bobbin 7, which will be described later, in the third direction. In other words, the core 8 includes the corner portions" 81 facing the inclined surfaces 711 in the third direction D3. Each of the corner portions 81 has a tapered shape. In an exemplary aspect, the core 8 is made of, for example, a ceramic such as ferrite that has high heat resistance.

In the present embodiment, the inner surfaces 710 of the pair of side walls 71*a* and 71*b* are formed so as to reduce an impact that is transmitted from the bobbin 7 to the core 8. The inner surfaces 710 of the pair of side walls 71*a* and 71*b* will be described in further detail with reference to FIG. 3 and FIG. 4.

As illustrated in FIG. 3, the inner surface 710 of the side wall 71*a* includes the inclined surfaces 711*a* and 711*b*, one of the contact surfaces 712, and connection surfaces 713*a* and 713*b*. Moreover, the inner surface 710 of the side wall 71*b* includes the inclined surfaces 711*c* and 711*d*, one of the contact surfaces 712, and connection surfaces 713*c* and 713*d*. In the present embodiment, the inner surface 710 of the side wall 71*a* and the inner surface 710 of the side wall 71*b* have the same shape, and thus, the inner surface of the side wall 71*a* will now be described in detail with reference to FIG. 4. In addition, the inclined surfaces 711*a*, 711*b*, 711*c*, and 711*d* will hereinafter sometimes be collectively called the inclined surfaces 711. The connection surfaces 713*a*, 713*b*, 713*c*, and 713*d* will hereinafter sometimes be collectively called the connection surfaces 713.

As illustrated in FIG. 4, the inner surface 710 of the side wall 71*a* includes the inclined surfaces 711*a* and 711*b*, one of the contact surfaces 712, and the connection surfaces 713*a* and 713*b*.

The inclined surfaces 711*a* and 711*b* are a pair of inclined surfaces that face each other in the third direction D3. The dimension of each of the inclined surfaces 711*a* and 711*b* in the first direction D1 is larger than or equal to the dimension of the winding 61 in the first direction D1. In the present embodiment, as illustrated in FIG. 9, each of the inclined surfaces 711*a* and 711*b* is formed so as to extend across the entire first region 70*a*. As illustrated in FIG. 3, the inclined surfaces 711*a* and 711*b* are provided on opposite sides of a corresponding one of the inner surfaces 710 in the third direction D3. Each of the inclined surfaces 711*a* and 711*b* overlaps the core 8 in the third direction D3 so as to be positioned closer to the core 8 than the winding 61 is. In other words, in the third direction D3, the distance between the inclined surface 711*a* and a surface of the core 8 that faces the inclined surface 711*a* and the distance between the inclined surface 711*b* and a surface of the core 8 that faces the inclined surface 711*b* are each shorter than the distance between the winding 61 and the surface of the core 8 facing the inclined surface 711*a* and are each shorter than the distance between the winding 61 and the surface of the core 8 facing the inclined surface 711*b*. As shown in FIG. 3, the inclined surfaces 711*a* and 711*b* respectively face the corner portions 81*a* and 81*b* of the core 8 in the third direction D3. Thus, in FIG. 3, the distance between the inclined surface 711*a* and the surface of the core 8 facing the Inclined surface 711*a*, the distance between the inclined surface 711*b* and the surface of the core 8 facing the inclined surface 711*b*, the distance between the inclined surface 711*a* and the corner portion 81*a* of the core 8, and the distance between the inclined surface 711*b* and the corner portion 81*b* of the core 8 are equal to one another. In FIG. 3, the distance between the winding 61 and the surface of the core 8 facing the inclined surface 711*a*, the distance between the winding 61 and the surface of the core 8 facing the inclined surface 711*b*, the distance between the winding 61 and the side surface 83*a* of the core 8, and the distance between the winding 61 and the side surface 83*b* of the core 8 are equal to one another. In the present embodiment, the core 8 may sometimes move in the third direction. The amount of change in the distance between the inclined surface 711*a* and the surface of the core 8 facing the inclined surface 711*a*, the amount of change in the distance between the inclined surface 711*b* and the surface of the core 8 facing the inclined surface 711*b*, the amount of change in the distance between the winding 61 and the surface of the core 8 facing the inclined surface 711*a*, and the amount of change in the distance between the winding 61 and the surface of the core 8 facing the inclined surface 711*b* due to movement of the core 8 in the third direction D3 are the same as one another in the exemplary aspect. Therefore, the relationship in which the inclined surfaces 711*a* and 711*b* are each closer to the core 8 than the winding 61 is in the third direction D3 is satisfied regardless of the position of the core 8 in the third direction D3.

As mentioned above, in FIG. 3, each of the inclined surfaces 711*a* and 711*b* overlaps the core 8 in the third direction D3 so as to be positioned closer to the core 8 than the winding 61 is. Thus, when the core approaches the inclined surfaces 711, the inclined surfaces 711 as opposed to the winding 61 contacts the core 8, which prevents the core 8 and the winding 61 from contacting each other. As a result, breakage or the like of the winding 61 due to contact between the core 8 and the winding 61 is prevented.

Moreover, the inclined surfaces 711*a* and 711*b* are inclined such that their distance from the core 8 in the third direction D3 increases as their distance from the core 8 in the second direction D2 decreases. In FIG. 4, the inclined surface 711*a* and 711*b* are flat surfaces, and the angle of each of the inclined surface 711*a* and 711*b* with respect to the third direction D3 is 45 degrees.

Figure 10:
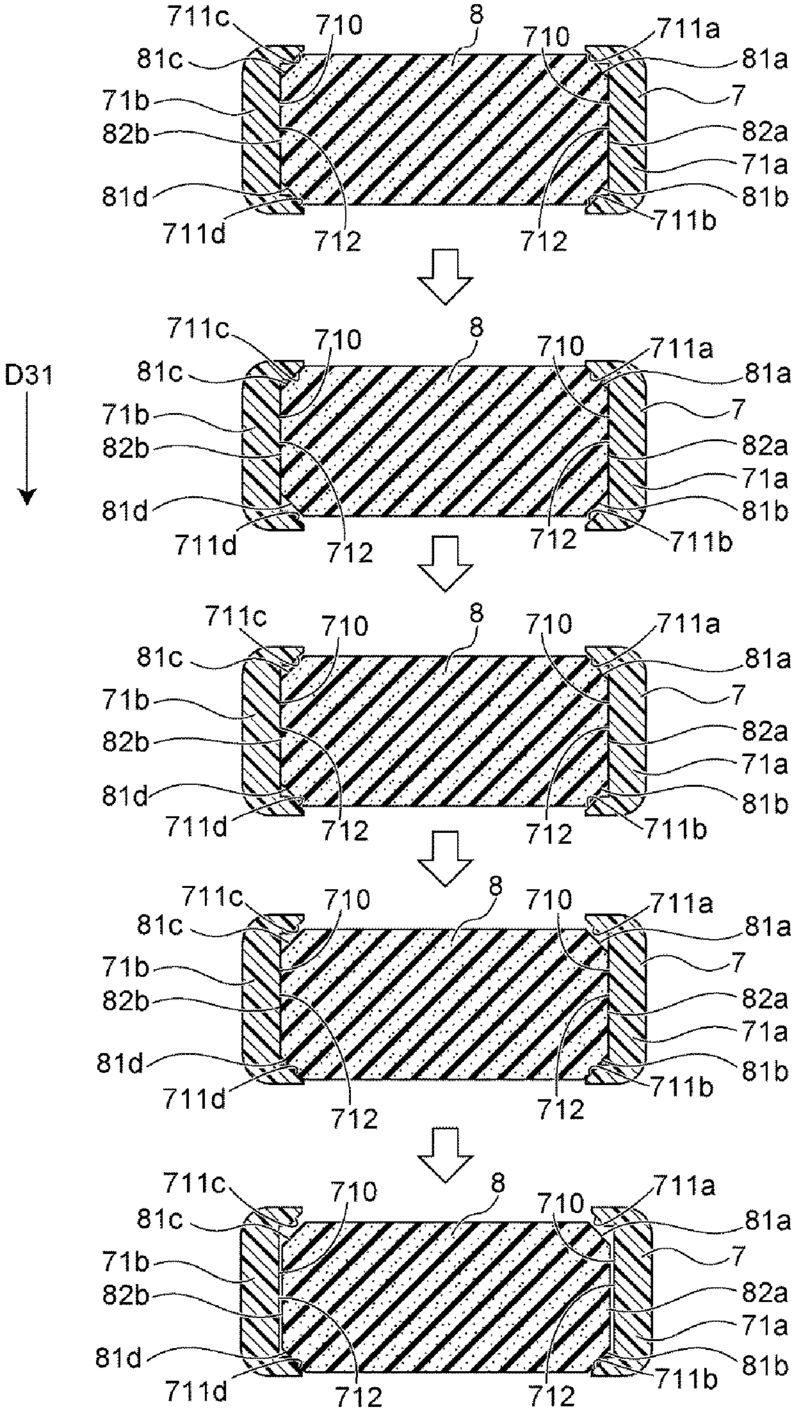
FIG. 10 is a diagram illustrating a mechanism for reducing an impact that acts on a core in the antenna device illustrated in FIG. 1.

The contact surfaces 712 are located between the inclined surfaces 711*a* and 711*b* in the third direction D3. The contact surfaces 712 come into contact with the core 8 in the second direction D2. In particular, the contact surfaces 712 of the inner surfaces 710 of the pair of side walls 71*a* and 71*b* respectively come into contact with the two side surfaces 82*a* and 82*b* of the core 8 in the second direction D2. It is noted that, although FIG. 3 and FIG. 4 illustrate a state where the contact surfaces 712 are not in contact with the side surfaces 82 of the core 8 in the second direction D2, the contact surfaces 712 respectively come into contact with the two side surfaces 82*a* and 82*b* of the core 8 in the second direction D2 as illustrated in FIG. 10. Thus, the contact surfaces 712 each have a surface shape that configures the core 8 to move in the third direction D3. In other words, the core 8 is configured to move along the third direction D3 while being in contact with the pair of side walls 71*a* and 71*b*. In the present embodiment, the size of each of the contact surfaces 712 in the third direction D3 is larger than the size of the side surface 83 of the core 8 in the third direction D3. In particular, the contact surfaces 712 are flat surfaces.

The connection surface 713*a* connects a corresponding one of the contact surfaces 712 and the inclined surface 711*a* to each other, and the connection surface 713*b* connects the corresponding contact surface 712 and the inclined surface 711*b* to each other. In one of the inner surfaces 710, the connection surface 713*a* is located between the inclined surface 711*a* and the corresponding contact surface 712, and the connection surface 713*b* is located between the inclined surface 711*b* and the corresponding contact surface 712. The angle of each of the connection surfaces 713*a* and 713*b* with respect to the third direction D3 is greater than the angle of each of the inclined surfaces 711*a* and 711*b* with respect to the third direction D3. In FIG. 4, the connection surfaces 713*a* and 713*b* are flat surfaces, and their angles with respect to the third direction D3 are each 90 degrees. The connection surfaces 713*a* and 713*b* are provided in order to stably bring the core 8 into contact with the inclined surfaces 711*a* and 711*b*. For example, in a configuration in which the connection surface 713*a* were to not be provided and the inclined surface 711*a* were contiguous to the contact surface 712, there is a possibility that the core 8 may become caught on a portion at the boundary between the inclined surface 711*a* and the contact surface 712. This is because, due to a shape error in an actual product, the angle formed by the inclined surface 711*a* and the contact surface 712 may sometimes be smaller than a set angle at the boundary portion between the inclined surface 711*a* and the contact surface 712, or the boundary portion between the inclined surface 711*a* and the contact surface 712 may sometimes have an unexpected shape. Since the connection surface 713*a* is provided, the core 8 is prevented from becoming caught at the boundary portion between the inclined surface 711*a* and the contact surface 712, and the core 8 is stably brought into contact with the inclined surface 711*a* and 711*b*.

The inner surfaces 710 of the pair of side walls 71*a* and 71*b* of the bobbin 7 are formed as described above. An operation when the inner surfaces 710 of the pair of side walls 71*a* and 71*b* reduce the impact that is transmitted from the bobbin 7 to the core 8 will be described in detail later.

According to the exemplary aspect, the first end portion 72 has a rectangular parallelepiped shape. The first end portion 72 connects the second ends (the left ends in FIG. 7 and FIG. 8) of the pair of side walls 71*a* and 71*b* to each other. The second end portion 73 has a rectangular parallelepiped shape. The second end portion 73 connects the first ends (the right ends in FIG. 7 and FIG. 8) of the pair of side walls 71*a* and 71*b* to each other.

The holding plate 74 is configured to hold the capacitor C1 and has a rectangular plate-like shape, for example. The holding plate 74 is disposed in the third region 70*c* of the pair of side walls 71*a* and 71*b* so as to connect the pair of side walls 71*a* and 71*b* to each other.

The winding drum portion 75 is configured to hold the winding 63 included in the third inductor. The winding drum portion 75 has a rectangular parallelepiped shape. The winding drum portion 75 projects from the first end portion 72. In particular, the winding drum portion 75 projects from the first end portion 72 in a direction (the second direction D2) that is perpendicular to the lengthwise direction of the pair of side walls 71*a* and 71*b*.

As illustrated in FIG. 7 and FIG. 8, the pair of protrusions 76 protrude in the third direction D3 from portions of the pair of side walls 71*a* and 71*b* that are not surrounded by the winding 61. The pair of protrusions 76 protrude from first ends (i.e., the upper ends in FIG. 8) of the pair of side walls 71*a* and 71*b* in the third direction D3. The pair of protrusions 76 are not physically connected to each other directly. Thus, as illustrated in FIG. 5, the bobbin 7 has an opening 761 between the pair of protrusions 76. As illustrated in FIG. 2 and FIG. 5, the amount of protrusion of each of the pair of protrusions 76 is set such that the pair of protrusions 76 do not come into contact with the case 3. In other words, the pair of protrusions 76 do not come into direct contact with the case 3. The elastic member 4 is interposed between the pair of protrusions 76 and the case 3.

As illustrated in FIG. 7 and FIG. 8, the pair of protrusions 77 protrude in the third direction D3 from portions of the pair of side walls 71*a* and 71*b* that are not surrounded by the winding 61. The pair of protrusions 77 protrude from third ends (i.e., the lower ends in FIG. 8) of the pair of side walls 71*a* and 71*b* in the third direction D3. The pair of protrusions 77 are not physically connected to each other directly. Thus, as illustrated in FIG. 5, the bobbin 7 has an opening 771 between the pair of protrusions 77. As illustrated in FIG. 2 and FIG. 5, the amount of protrusion of each of the pair of protrusions 77 is set such that the pair of protrusions 77 do not come into contact with the case 3. In other words, the pair of protrusions 77 do not come into direct contact with the case 3. The elastic member 4 is interposed between the pair of protrusions 77 and the case 3.

In the exemplary aspect, the first to fourth connecting members 91 to 94 are made of a material having electrical conductivity such as a metal material.

As illustrated in FIG. 7 and FIG. 8, the first connection member 91 includes a connection terminal 911 and a winding terminal 912, and the second connection member 92 includes a connection terminal 921 and a winding terminal 922. The connection terminals 911 and 921 each have a bar-like shape. The connection terminals 911 and 921 project from the first end portion 72. In particular, the connection terminals 911 and 921 project from the first end portion 72 toward the side opposite to the side on which the pair of side walls 71*a* and 71*b* are present. The connection terminals 911 and 921 are used for electrically connecting the antenna device 1 to an external driving circuit. The winding terminals 912 and 922 project from the first end portion 72. The winding terminals 912 and 922 project from the first end portion 72 in a direction (i.e., the second direction D2) that is perpendicular to the lengthwise direction of the pair of side walls 71*a* and 71*b*. The winding terminals 912 and 922 project in opposite directions.

As illustrated in FIG. 7 and FIG. 8, the third connection member 93 includes a winding terminal 931 and a connection terminal 932, and the fourth connection member 94 includes a winding terminal 941 and a connection terminal 942. The third and fourth connection members 93 and 94 are fixed to the holding plate 74. In particular, the third and fourth connection members 93 and 94 are fixed to a surface of the holding plate 74, the surface being located on the side opposite to the side on which the pair of side walls 71*a* and 71*b* are located.

As illustrated in FIG. 7 and FIG. 8, the winding 61 is formed of a conductor wire W1. More specifically, the conductor wire W1 is wound around the first region 70*a* of the pair of side walls 71*a* and 71*b* of the bobbin 7 in such a manner that the axial direction of the winding 61 is the same as the lengthwise direction of the pair of side walls 71*a* and 71*b* (i.e., the first direction D1). The portion of the conductor wire W1 wound around the first region 70*a* forms the winding 61. In the manner described above, the winding 61 is wound around the bobbin 7 so as to collectively surround the pair of side walls 71*a* and 71*b* while the axial direction thereof is parallel to the first direction D1. According to an exemplary aspect, the number of turns of the winding 61 can be, for example, 100, but this number is not so limited. One end of the conductor wire W1 is fixed to and electrically connected to the winding terminal 922 of the second connection member 92, and the other end of the conductor wire W1 is fixed to and electrically connected to the winding terminal 941 of the fourth connection member 94. For example, the one end of the conductor wire W1 is wound around and joined to the winding terminal 922, and the other end of the conductor wire W1 is wound around and joined to the winding terminal 941.

As illustrated in FIG. 7 and FIG. 8, the winding 62 is formed of a conductor wire W2. More specifically, the conductor wire W2 is wound around the second region 70*b* of the pair of side walls 71*a* and 71*b* of the bobbin 7 in such a manner that the axial direction of the winding 62 is the same as the lengthwise direction of the pair of side walls 71*a* and 71*b* (i.e., the first direction D1). The portion of the conductor wire W2 wound around the second region 70*b* forms the winding 62.

As illustrated in FIG. 7 and FIG. 8, the winding 63 is formed of the conductor wire W2. More specifically, the conductor wire W2 is wound around the winding drum portion 75 of the bobbin 7. The portion of the conductor wire W2 wound around the winding drum portion 75 forms the winding 63. Moreover, the winding drum portion 75 projects from the first end portion 72 in the second direction D2, and thus, the axial direction of the winding 63 is a direction perpendicular to the first direction D1.

Since the winding 62 and the winding 63 are formed of the same conductor wire W2, the winding 62 and the winding 63 are electrically connected in series to each other. As illustrated in FIG. 7, one end of the conductor wire W2 is fixed to and electrically connected to the winding terminal 912 of the first connection member 91, and the other end of the conductor wire W2 is fixed to and electrically connected to the winding terminal 931 of the third connection member 93. For example, the one end of the conductor wire W2 is wound around and joined to the winding terminal 912, and the other end of the conductor wire W2 is wound around and joined to the winding terminal 931.

As described above, the capacitor C1 is held by the holding plate 74. In particular, the capacitor C1 is held by the third and fourth connection members 93 and 94 on the holding plate 74. One end of the capacitor C1 is fixed to and electrically connected to the connection terminal 932 of the third connection member 93, and the other end of the capacitor C1 is fixed to and electrically connected to the connection terminal 942 of the fourth connection member 94. In this manner, the capacitor C1 is electrically connected in series to the first inductor.

As illustrated in FIG. 1 and FIG. 2, the antenna body 2 is accommodated in the case 3. As illustrated in FIG. 2, the case 3 has a cylindrical shape extending in the first direction D1. The case 3 has, for example, a rectangular cylindrical shape extending in the first direction D1. A first end 31*a* of the case 3 in the first direction D1 is open, and a second end 31*b* of the case 3 in the first direction D1 is closed. The antenna body 2 is inserted into the case 3 through the first end 31*a* of the case 3. As illustrated in FIG. 3 and FIG. 6, the case 3 includes two side walls 32*a* and 32*b* in the second direction D2. The side walls 32*a* and 32*b* face the pair of side walls 71*a* and 71*b*, respectively. The side walls 32*a* and 32*b* are parallel to each other. The case 3 includes two side walls 33*a* and 33*b* in the third direction D3. The side walls 33*a* and 33*b* are parallel to each other. In an exemplary aspect, the case 3 is made of, for example, a non-magnetic resin material having an insulating property.

The elastic member 4 is provided in order to reduce an impact that is transmitted from the case 3 to the bobbin 7. As illustrated in FIG. 2 and FIG. 6, the elastic member 4 includes a first portion 41, a second portion 42, and a connection portion 43. The first portion 41 is interposed between the antenna body 2 and the side walls 33*a* and 33*b*. The second portion 42 is interposed between the antenna body 2 and the side wall 33*b* of the case 3. Consequently, the elastic member 4 reduces the impact in the third direction D3. The connection portion 43 continuously and integrally connects the first portion 41 and the second portion 42 to each other. The connection portion 43 is interposed between the antenna body 2 and the second end 31*b* of the case 3. The elastic member 4 is made of, for example, sponge, rubber, or the like.

The connector 5 is used for mechanically connecting the antenna device 1 to an external driving circuit. As illustrated in FIG. 2 and FIG. 6, the connector 5 includes a fixing portion 51 and a tubular portion 52. The fixing portion 51 is used for coupling the connector 5 to the first end portion 72 of the bobbin 7 of the antenna body 2. The tubular portion 52 collectively surrounds the connection terminals 911 and 921 of the first and second connection members 91 and 92. The connector 5 is fixed to the case 3 in such a manner as to close the first end 31*a* of the case 3. In an exemplary aspect, the connector 5 is made of, for example, a non-magnetic resin material having an insulating property.

An electrical circuit of the above-described antenna device 1 will now be described. The antenna device 1 includes the first inductor (i.e., the winding 61 and the core 8), the second inductor (i.e., the winding 62 and the core 8), the third inductor (i.e., the winding 63), and the capacitor C1. In the antenna device 1, the capacitor C1 is electrically connected in series to the first inductor. The first inductor and the capacitor C1 form a series resonance circuit. The second inductor and the third inductor are electrically connected in series to the series resonance circuit. The third inductor is electrically connected in series to the second inductor. The second inductor and the third inductor are used as a resistance circuit for adjusting the resistance of the antenna device 1. By adjusting the resistance of the resistance circuit, the magnitude of a current at a specific frequency can be adjusted, and the Q value can be adjusted. The specific frequency is, for example, the resonant frequency of the series resonance circuit formed of the first inductor and the capacitor C1.

[3. Operation when Impact Acts on Case]

As described above, in the present embodiment, the inner surfaces 710 of the pair of side walls 71*a* and 71*b* are formed so as to reduce an impact that is transmitted from the bobbin 7 to the core 8. A configuration for when the inner surfaces 710 of the pair of side walls 71*a* and 71*b* reduce an impact that is transmitted from the bobbin 7 to the core 8 will be described below with reference to FIG. 10. It is noted that the vertical direction in FIG. 10 corresponds to the third direction D3. In FIG. 10, down arrow D31 indicates a direction parallel to the third direction D3.

In an initial state illustrated at the top in FIG. 10, the side surface 82*a* of the core 8 is in contact with the contact surface 712 included in the inner surface 710 of the side wall 71*a* of the bobbin 7, and the side surface 82*b* of the core 8 is in contact with is in contact with the contact surface 712 included in the inner surface 710 of the side wall 71*b* of the bobbin 7. In the initial state, each of the corner portions 81*a* to 81*d* of the core 8 is not in contact with a corresponding one of the inclined surfaces 711*a* to 711*d* of the pair of side walls 71*a* and 71*b* of the bobbin 7.

In the initial state, when an impact in the direction indicated by down arrow D31 in FIG. 10 acts on the case 3, the impact is transmitted from the case 3 to the bobbin 7, and the bobbin 7 moves in the direction indicated by down arrow D31 in FIG. 10 together with the case 3. Since the contact surfaces 712 of the bobbin 7 each have a surface shape that enables the core 8 to move in the third direction D3, the bobbin 7 moves in the direction indicated by down arrow D31 in FIG. 10 with respect to the core 8 as illustrated in the second diagram from the top in FIG. 10. As a result of the bobbin 7 moving with respect to the core 8, the impact that is transmitted from the bobbin 7 to the core 8 is reduced.

In addition, when the bobbin 7 moves in the direction indicated by down arrow D31 in FIG. 10 with respect to the core 8, since each of the inclined surfaces 711 overlaps the core 8 so as to be positioned closer to the core 8 than the winding 61 is in the third direction D3, the corner portions 81*a* and 81*c* of the core 8 come into contact with the inclined surfaces 711*a* and 711*c* of the pair of side walls 71*a* and 71*b* of the bobbin 7, respectively, without coming into contact with the winding 61. As a result, the impact is transmitted from the bobbin 7 to the core 8. However, since the inclined surfaces 711*a* and 711*c* are inclined, such that their distance from the core 8 in the third direction D3 increases as their distance from the core in the second direction D2 decreases, the impact that is transmitted form the bobbin 7 to the core 8 is dispersed in the second direction D2 and the third direction D3. Thus, the impact that is transmitted from the bobbin 7 to the core 8 in the direction indicated by down arrow D31 is further reduced. In addition, the inclined surfaces 711 prevent the core 8 and the winding 61 from coming into contact with each other, and thus, breakage or the like of the winding 61 due to contact between the core 8 and the winding 61 is prevented.

When the corner portions 81*a* and 81*c* of the core 8 contact the inclined surfaces 711*a* and 711*c* of the pair of side walls 71*a* and 71*b* of the bobbin 7, respectively, the core 8 receives an impact in the direction indicated by down arrow D31 from the bobbin 7. Since the contact surfaces 712 of the bobbin 7 each have a surface shape that enables the core 8 to move in the third direction D3, the core 8 moves in the direction indicated by down arrow D31 in FIG. 10 with respect to the bobbin 7 as illustrated in the third diagram from the top in FIG. 10. As a result of the core 8 moving with respect to the bobbin 7, the impact that acts on the core 8 is reduced.

In addition, when the core 8 moves in the direction indicated by down arrow D31 in FIG. 10 with respect to the bobbin 7, since each of the inclined surfaces 711 overlaps the core 8 in the third direction D3 so as to be positioned closer to the core 8 than the winding 61 is, as illustrated in the fourth diagram from the top in FIG. 10, the corner portions 81*b* and 81*d* of the core 8 come into contact with the inclined surfaces 711*b* and 711*d* of the pair of side walls 71*a* and 71*b* of the bobbin 7, respectively, without coming into contact with the winding 61. As a result, the impact is transmitted from the bobbin 7 to the core 8. However, since the inclined surfaces 711*b* and 711*d* are inclined such that their distance from the core 8 in the third direction D3 increases as their distance from the core in the second direction D2 decreases, the impact that is transmitted form the bobbin 7 to the core 8 is dispersed in the second direction D2 and the third direction D3. Thus, the impact that is transmitted from the bobbin 7 to the core 8 in the direction indicated by down arrow D31 is further reduced.

In addition, when the core 8 tries to move in the direction indicated by down arrow D31 in FIG. 10 with respect to the bobbin 7, the inclined surfaces 711*b* and 711*d* of the pair of side walls 71*a* and 71*b* of the bobbin 7 are pushed by the corner portions 81*b* and 81*d* of the core 8. As described above, the inclined surfaces 711*b* and 711*d* are inclined such that their distance from the core 8 in the third direction D3 increases as their distance from the core in the second direction D2 decreases. Thus, as illustrated at the bottom in FIG. 10, the pair of side walls 71*a* and 71*b* are pushed by the core 8 so as to move away from each other in the second direction D2, and the corner portions 81*b* and 81*d* of the core 8 slide along the inclined surfaces 711*b* and 711*d*. As a result of the pair of side walls 71*a* and 71*b* moving in directions away from each other as described above, the impact that acts on the core 8 is reduced.

In the antenna device 1 of the present embodiment, the impact that is transmitted from the bobbin 7 to the core 8 is reduced in the manner described above, so that the impact that acts on the core 8 is reduced. In addition, in the antenna device 1, since the elastic member 4 is provided between the case 3 and the antenna body 2, the impact that is transmitted from the case 3 to the bobbin 7 are also reduced. Therefore, in the antenna device 1, the impact that is transmitted from the bobbin 7 to the core 8 is reduced while the impact that is transmitted from the case 3 to the bobbin 7 is also reduced.

[4. Technical Advantages]

As mentioned above, the antenna device 1 includes the antenna body 2 and the case 3 in which the antenna body 2 is accommodated. The antenna body 2 includes the bobbin 7, the winding 61, and the core 8. The bobbin 7 includes the pair of side walls 71*a* and 71*b*. The pair of side walls 71*a* and 71*b* extend in the first direction D1 and have the inner surfaces 710, which face each other in the second direction D2 crossing the first direction D1. The winding 61 is wound around the bobbin 7 in such a manner as to collectively surround the pair of side walls 71*a* and 71*b* while the axial direction thereof is parallel to the first direction D1. As also described above, the core 8 is held by the pair of side walls 71*a* and 71*b* so as to be located between the inner surfaces 710 of the pair of side walls 71*a* and 71*b* in the inner space defined by the winding 61. Both the inner surfaces 710 of the pair of side walls 71*a* and 71*b* include the inclined surfaces 711. Each of the inclined surfaces 711 overlaps the core 8 in the third direction D3 crossing both the first direction D1 and the second direction D2 so as to be positioned closer to the core 8 than the winding 61 is, and the inclined surfaces 711 are inclined such that their distance from the core 8 in the third direction D3 increases as their distance from the core in the second direction D2 decreases. According to this configuration, the impact that acts on the core 8 is reduced.

In the antenna device 1, the dimension of each of the pair of side walls 71*a* and 71*b* in the third direction D3 is larger than the dimension of the core 8 in the third direction D3. According to this configuration, projection of the core 8 from the side walls 71*a* and 71*b* in the third direction D3 is suppressed, and contact between the core 8 and the winding 61 is also suppressed.

In the antenna device 1, the inner surfaces 710 of the pair of side walls 71*a* and 71*b* each have the pair of inclined surfaces 711 that face each other in the third direction D3. According to this configuration, projection of the core 8 from the side walls 71*a* and 71*b* in the third direction D3 is suppressed, and contact between the core 8 and the winding 61 is also suppressed.

In the antenna device 1, each of the inner surfaces 710 of the pair of side walls 71*a* and 71*b* has the corresponding contact surface 712 that comes into contact with one of the side surfaces 82 of the core 8 in the second direction D2. According to this configuration, movement of the core 8 in the second direction D2 is restricted.

In addition, in the antenna device 1, the contact surfaces 712 each have a surface shape that enables the core 8 to move in the third direction D3. According to this configuration, the impact acting on the core 8 can be released by the movement of the core 8 in the second direction D2, so that the impact that acts on the core 8 can be reduced.

In the antenna device 1, the dimension of each of the contact surfaces 712 in the third direction D3 is larger than the dimension of each of the side surfaces 82 of the core 8 in the third direction D3. According to this configuration, the impact acting on the core 8 can be released by the movement of the core 8 in the second direction D2, so that the impact that acts on the core 8 is reduced.

In the antenna device 1, at least one of the inner surfaces 710 of the pair of side walls 71*a* and 71*b* has the connection surfaces 713 connecting the inclined surfaces 711 to the corresponding contact surface 712. The angle of each of the connection surfaces 713 with respect to the third direction D3 is greater than the angle of each of the inclined surfaces 711 with respect to the third direction D3. According to this configuration, the inclined surfaces 711 and the core 8 can stably come into contact with each other. In the above-described embodiment, the angle of each of the connection surfaces 713 with respect to the third direction D3 is 90 degrees, and the angle of each of the inclined surfaces 711 with respect to the third direction D3 is 45 degrees.

In the antenna device 1, the core 8 includes the corner portions 81 each of which faces a corresponding one of the inclined surfaces 711 in the third direction D3. The corner portions 81 each have a tapered shape in the exemplary aspect. According to this configuration, the inclined surfaces 711 and the core 8 can stably contact each other. It is also noted that each of the corner portions 81 may have a rounded shape in an alternative aspect.

In the antenna device 1, the bobbin 7 includes the pair of protrusions 76 protruding in the third direction D3 from the portions of the pair of side walls 71*a* and 71*b* that are not surrounded by the winding 61. The pair of protrusions 76 do not come into direct contact with the case 3. According to this configuration, the impact that is transmitted from the case 3 to the bobbin 7 is reduced, and the impact that acts on the core 8 is also reduced. In the antenna device 1, the bobbin 7 includes the pair of protrusions 77 protruding in the third direction D3 from the portions of the pair of side walls 71*a* and 71*b* that are not surrounded by the winding 61. The pair of protrusions 77 do not come into direct contact with the case 3. According to this configuration, the impact that is transmitted from the case 3 to the bobbin 7 is reduced, and the impact that acts on the core 8 is also reduced.

In addition, in the antenna device 1, the bobbin 7 has the opening 761 between the pair of protrusions 76. According to this configuration, an impact will not be transmitted from the case 3 to a center portion of the core 8, and thus, the probability of breakage of the core 8 can be reduced. In addition, in the antenna device 1, the bobbin 7 has the opening 771 between the pair of protrusions 77. According to this configuration, an impact will not be transmitted from the case 3 to the center portion of the core 8, and thus, the probability of breakage of the core 8 is reduced.

According to an exemplary aspect of the antenna device 1, the core 8 has a bar-like shape extending in the first direction D1, and the dimension of the core 8 in the third direction D3 is smaller than the dimension of the core 8 in the second direction D2. According to this configuration, the impact in the third direction D3 with which the strength of the core 8 becomes relatively weak can be reduced, and the probability of breakage of the core 8 is reduced.

In the antenna device 1, the angle of each of the inclined surfaces 711 with respect to the third direction D3 is greater than zero degree and is less than or equal to 45 degrees. According to this configuration, a force that is applied to the core 8 due to an impact can be dispersed such that the force in the third direction D3 is less than or equal to the force in the second direction D2. Therefore, the impact that acts on the core 8 can be reduced. In the above-described embodiment, the angle of each of the inclined surfaces 711 with respect to the third direction D3 is 45 degrees.

In the antenna device 1, the dimension of each of the inclined surfaces 711 in the first direction D1 is larger than or equal to the dimension of the winding 61 in the first direction D1. According to this configuration, the inclined surfaces 711 are configured to suppress contact between the core 8 and the winding 61.

In the antenna device 1, the antenna device 1 further includes the elastic member 4 interposed between the antenna body 2 and the case 3 in the third direction D3. According to this configuration, the impact that is transmitted from the case 3 to the bobbin 7 is reduced, and the impact that acts on the core 8 is also reduced.

(Modifications)

The exemplary embodiment of the present disclosure is not limited to the above-described embodiment. Various modifications can be made to the above-described embodiment in accordance with design and so forth as long as the object of the present disclosure can be achieved. Modifications of the above-described embodiment will be enumerated below. The following modifications can be suitably combined and implemented.

[1. First Modification]

Figure 11:
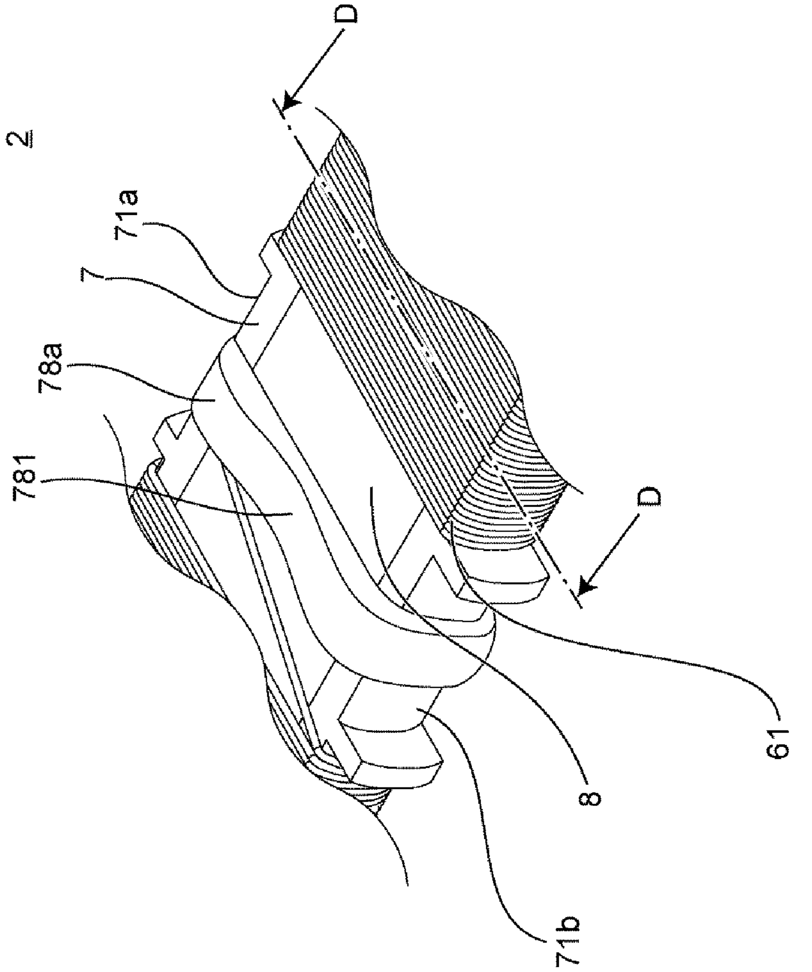
FIG. 11 is a partial perspective view of an antenna body of an antenna device of a first modification of the exemplary embodiment.
Figure 12:
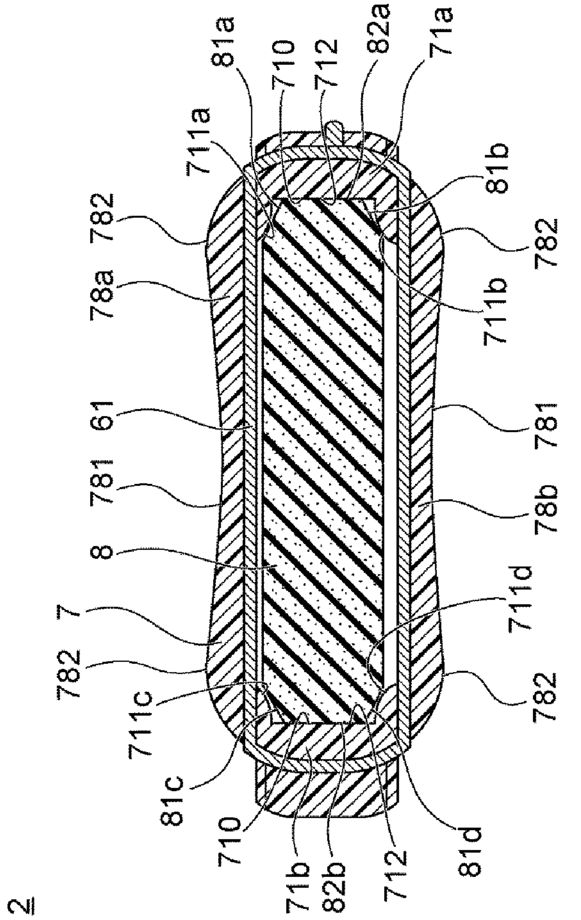
FIG. 12 is a cross-sectional view taken along line D-D of FIG. 11.

FIG. 11 is a partial perspective view of the antenna body 2 of the antenna device 1 of a first modification of the exemplary embodiment, and FIG. 12 is a cross-sectional view taken along line D-D of FIG. 11. As illustrated in FIG. 11 and FIG. 12, the bobbin 7 includes connection portion 78*a* and 78*b* (hereinafter sometimes collectively referred to as "connection portions 7"). The connection portion 78*a* and 78*b* connect, from outside the pair of side walls 71*a* and 71*b*, the portions of the pair of side walls 71*a* and 71*b* that are not surrounded by the winding 61. The connection portion 78*a* is located on the side on which the first ends (i.e., the upper ends in FIG. 12) of the pair of side walls 71*a* and 71*b* are located in the third direction D3. Positioning of the pair of side walls 71*a* and 71*b* and enhancement of the overall strength of the bobbin 7 can be achieved by the connection portion 78*a* and 78*b*. The connection portion 78*b* is located on the side on which the first ends (i.e., the lower ends in FIG. 12) of the pair of side walls 71*a* and 71*b* are located in the third direction D3. Each of the connection portions 78 includes a center portion 781 and two end portions 782 in the second direction D2. Surfaces of the connection portions 78, the surfaces being located on the side opposite to the side on which the core 8 is disposed, each have a surface shape in which the two end portions 782 project more than the center portion 781. In other words, each of the connection portions 78 is more likely to come into contact with the case 3 at the two end portions 782 than at the center portion 781. Thus, the center portions 781 of the connection portions 78 are less likely to come into contact with the core 8. According to the first modification, an impact will not be transmitted from the case 3 to the center portion of the core 8, and thus, the probability of breakage of the core 8 is reduced.

[2. Second Modification]

Figure 13:
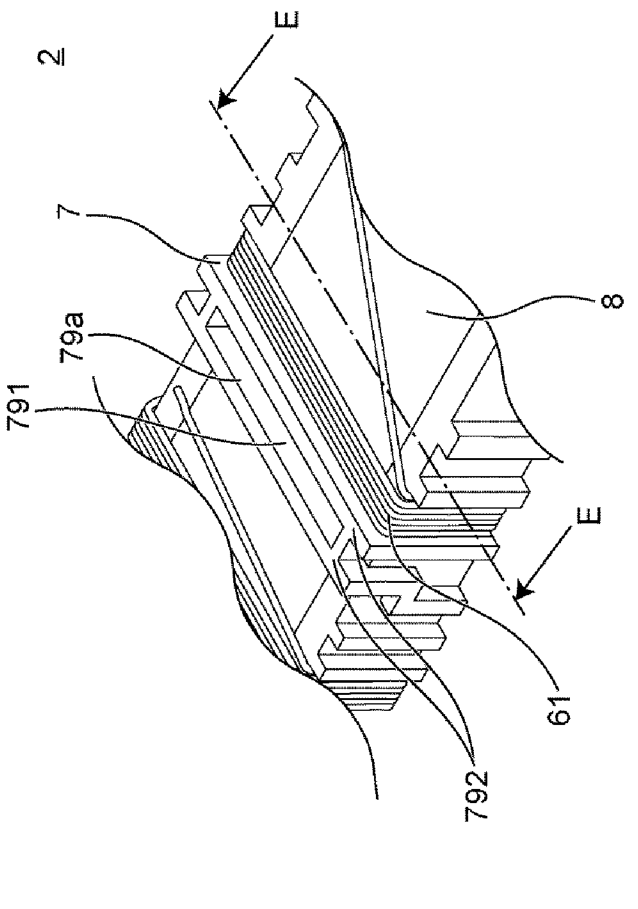
FIG. 13 is a partial perspective view of an antenna body of an antenna device of a second modification of the exemplary embodiment.
Figure 14:
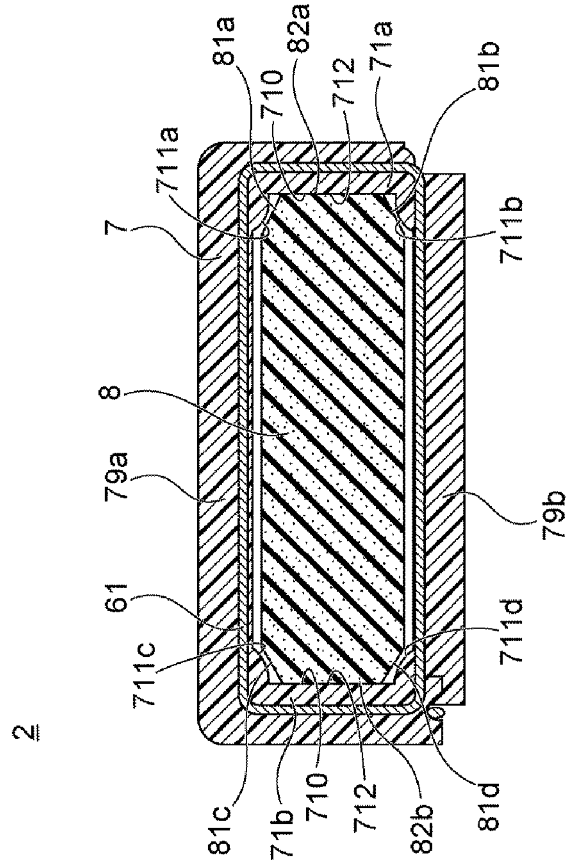
FIG. 14 is a cross-sectional view taken along line E-E of FIG. 13.

FIG. 13 is a partial perspective view of the antenna body 2 of the antenna device 2 of a second modification of the exemplary embodiment, and FIG. 14 is a cross-sectional view taken along line E-E of FIG. 13. As illustrated in FIG. 13 and FIG. 14, the bobbin 7 includes connection portion 79*a* and 79*b* (hereinafter sometimes collectively referred to as "connection portions 7"). The connection portion 79*a* and 79*b* connect, from outside the pair of side walls 71*a* and 71*b*, the portions of the pair of side walls 71*a* and 71*b* that are not surrounded by the winding 61. The connection portion 79*a* is located on the side on which the first ends (the upper ends in FIG. 14) of the pair of side walls 71*a* and 71*b* in the third direction D3. The connection portion 79*b* is located on the side on which the first ends (i.e., the lower ends in FIG. 14) of the pair of side walls 71*a* and 71*b* are located in the third direction D3. Positioning of the pair of side walls 71*a* and 71*b* and enhancement of the overall strength of the bobbin 7 can be achieved by the connection portion 79*a* and 79*b*. Each of the connection portions 79 includes a center portion 791 and two end portions 792 in the first direction D1. Surfaces of the connection portions 79, the surfaces being located on the side opposite to the side on which the core 8 is disposed, each have a surface shape in which the two end portions 792 project more than the center portion 791. In other words, each of the connection portions 79 is more likely to come into contact with the case 3 at the two end portions 792 than at the center portion 791. Thus, even when the connection portions 79 contacts the core 8, the area of the core 8 subjected to a force in the first direction D1 can be increased. According to the second modification, the impact from the case 3 is less likely to be concentrated at one point of the core 8 in the first direction D1, and thus, the probability of breakage of the core 8 is reduced.

[3. Third Modification]

Figure 15:
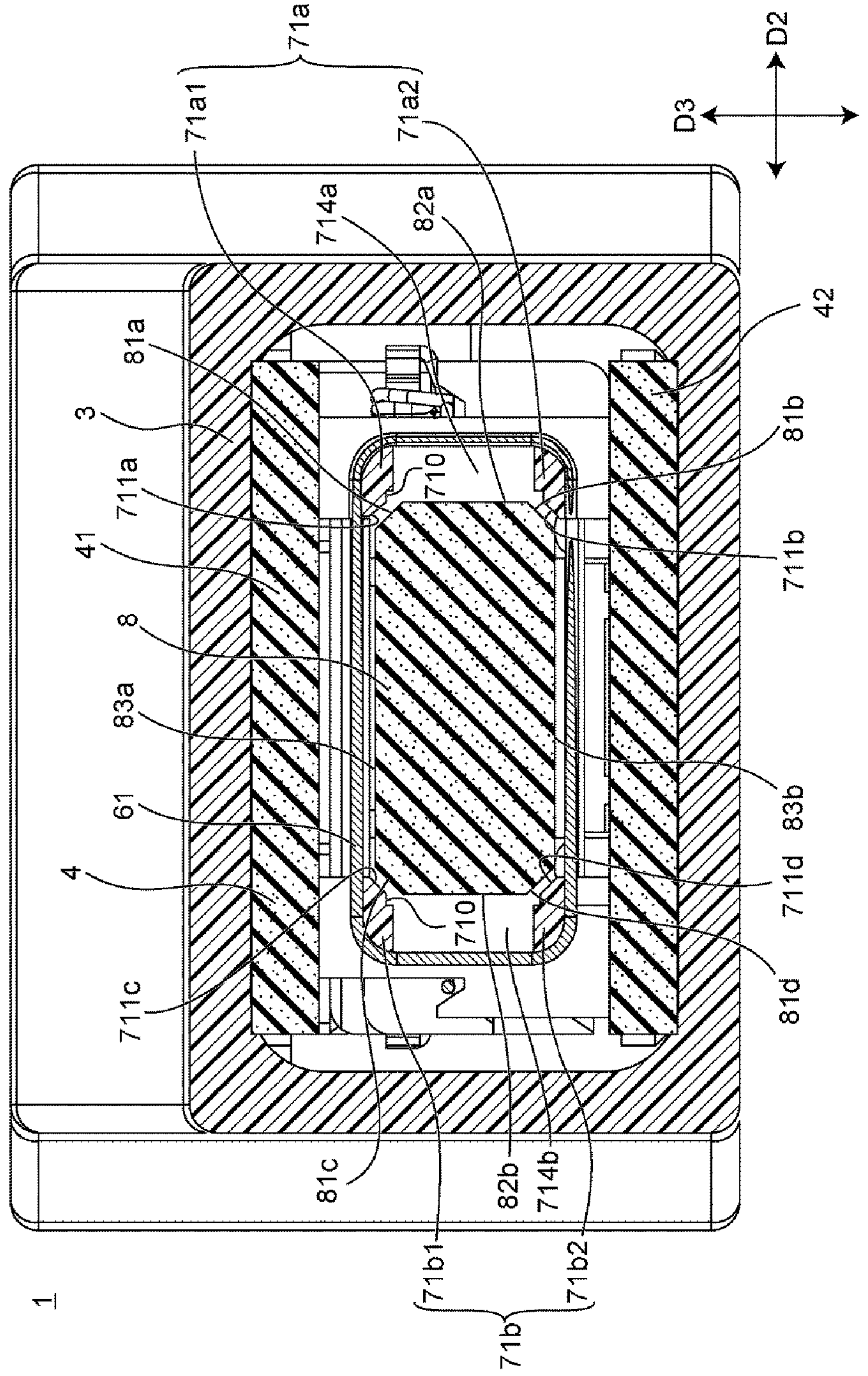
FIG. 15 is a cross-sectional view of an antenna device of a third modification of the exemplary embodiment.

FIG. 15 is a cross-sectional view of the antenna device 1 of a third modification of the exemplary embodiment. In FIG. 15, the pair of side walls 71*a* and 71*b* of the bobbin 7 have openings 714*a* and 714*b*, respectively. More specifically, the side wall 71*a* is formed of a pair of wall portions 71*a*1 and 71*a*2 that face each other in the third direction D3. A space between the pair of wall portions 71*a*1 and 71*a*2 forms the opening 714*a*. The inner surface 710 of the wall portion 71*a*1 includes the inclined surface 711*a*, and the inner surface 710 of the wall portion 71*a*2 includes the inclined surface 711*b*. The side wall 71*b* is formed of a pair of wall portions 71*b*1 and 71*b*2 that face each other in the third direction D3. A space between the pair of wall portions 71*b*1 and 71*b*2 forms the opening 714*b*. The inner surface 710 of the wall portion 71*b*1 includes the inclined surface 711*c*, and the inner surface 710 of the wall portion 71*b*2 includes the inclined surface 711*d*. In this manner, the side walls 71*a* and 71*b* of the bobbin 7 may each be formed of a plurality of members instead of a single member.

[4. Additional Modifications]

In the above-described embodiment, both the inner surfaces 710 of the pair of side walls 71*a* and 71*b* include the inclined surfaces 711. In a modification of the exemplary embodiment, only one of the inner surfaces 710 of the pair of side walls 71*a* and 71*b* may include the inclined surfaces 711. In other words, it is only necessary that at least one of the inner surfaces 710 of the pair of side walls 71*a* and 71*b* include the inclined surfaces 711.

In a modification of the exemplary embodiment, the angle of each of the inclined surfaces 711 with respect to the third direction D3 does not need to be greater than zero degree or to be less than or equal to 45 degrees. In the above-described embodiment, although each of the inclined surfaces 711 is a flat surface having a constant inclination, each of the inclined surfaces 711 is not limited to this and may be a curved surface or may be formed of a plurality of surfaces having different inclinations. In other words, it is only necessary for each of the inclined surfaces 711 to have a shape that can convert part of a component of the impact acting on the core 8 in the third direction D3 into a component in the second direction D2.

In a modification of the exemplary embodiment, the dimension of each of the pair of side walls 71*a* and 71*b* in the third direction D3 does not need to be larger than the dimension of the core 8 in the third direction D3.

In the above embodiment, the inner surfaces 710 of the pair of side walls 71*a* and 71*b* each have the pair of inclined surfaces 711 that face each other in the third direction D3. In a modification of the exemplary embodiment, only one of the inner surfaces 710 of the pair of side walls 71*a* and 71*b* may have the pair of inclined surfaces 711 that face each other in the third direction D3. In other words, it is only necessary that at least one of the inner surfaces 710 of the pair of side walls 71*a* and 71*b* include the pair of inclined surfaces 711 that face each other in the third direction D3.

In the above-described embodiment, each of the inner surfaces 710 of the pair of side walls 71*a* and 71*b* includes the corresponding contact surface 712. In a modification of the exemplary embodiment, only one of the inner surfaces 710 of the pair of side walls 71*a* and 71*b* may include the contact surface 712. In other words, it is only necessary that at least one of the inner surfaces 710 of the pair of side walls 71*a* and 71*b* include the contact surface 712.

In a modification of the exemplary embodiment, each of the contact surfaces 712 is not limited to being a flat surface and may be a surface that has a plurality of protrusions each having a flat end. In other words, it is only necessary for each of the contact surfaces 712 to have a surface shape that configures the core 8 to move in the third direction D3. On the other hand, each of the contact surfaces 712 does not need to have a surface shape that configures the core 8 to move in the third direction D3. In a modification of the exemplary embodiment, the dimension of each of the contact surfaces 712 in the third direction D3 does not need to be larger than the dimension of each of the side surfaces 82 of the core 8 in the third direction D3.

In a modification of the exemplary embodiment, only one of the inner surfaces 710 of the pair of side walls 71*a* and 71*b* may include the connection surfaces 713. In other words, it is only necessary that at least one of the inner surfaces 710 of the pair of side walls 71*a* and 71*b* include the connection surfaces 713. The angle of each of the connection surfaces 713 with respect to the third direction D3 does not need to be greater than the angle of each of the inclined surfaces 711 with respect to the third direction D3.

In a modification of the exemplary embodiment, the corner portions 81 of the core 8 may each have a right-angled shape instead of a tapered shape or a rounded shape. In a modification of the exemplary embodiment, the core 8 does not need to have a bar-like shape extending in the first direction D1. In a modification of the exemplary embodiment, the dimension of the core 8 in the third direction D3 does not need to be smaller than the dimension of the core 8 in the second direction D2.

In a modification of the exemplary embodiment, the bobbin 7 does not need to include either the pair of protrusions 76 or the pair of protrusions 77. In a modification of the exemplary embodiment, the bobbin 7 does not need to have either the opening 761 or the opening 771.

In a modification of the exemplary embodiment, the dimension of each of the inclined surfaces 711 in the first direction D1 does not need to be larger than or equal to the dimension of the winding 61 in the first direction D1. In a modification of the exemplary embodiment, some of the plurality of inclined surfaces 711 may be arranged along the first direction D1.

In a modification of the exemplary embodiment, the antenna device 1 does not need to include the elastic member 4. In a modification of the exemplary embodiment, the antenna device 1 does not need to include the connector 5.

In the above-described embodiment, although the antenna device 1 is a series resonance circuit including the first inductor and the capacitor C1, the antenna device 1 is not limited to being such a series resonance circuit. For example, the antenna device 1 may be a parallel resonance circuit in an alternative aspect. In addition, the antenna device 1 may have a well-known circuit structure and may include another circuit element or component in addition to the first inductor and the capacitor C1. Alternatively, the antenna device 1 does not need to include the capacitor C1. The antenna device 1 does not need to include either the winding 62 or the winding 63.

(Exemplary Aspects)

As is clear from the exemplary embodiment and the modifications described above, the present disclosure includes the following aspects. In the following aspect descriptions, reference signs in parentheses are given only to clarify their correspondence with the embodiment.

A first exemplary aspect is an antenna device (1) that includes an antenna body (2) and a case (3) in which the antenna body (2) is accommodated. The antenna body (2) includes a bobbin (7), a winding (61), and a core (8). The bobbin (7) includes a pair of side walls (71*a*, 71*b*). The pair of side walls (71*a*, 71*b*) extend in a first direction (D1) and have inner surfaces (710) that face each other in a second direction (D2) crossing the first direction (D1). The winding (61) is wound around the bobbin (7) in such a manner as to collectively surround the pair of side walls (71*a*, 71*b*) while the axial direction thereof is parallel to the first direction (D1). The core (8) is held by the pair of side walls (71*a*, 71*b*) so as to be located between the inner surfaces (710) of the pair of side walls (71*a*, 71*b*) in an inner space defined by the winding (61). At least one of the inner surfaces (710) of the pair of side walls (71*a*, 71*b*) includes an inclined surface (711). The inclined surface (711) overlaps the core (8) in a third direction (D3) in such a manner as to be positioned closer to the core (8) than the winding (61) is, the third direction (D3) crossing both the first direction (D1) and the second direction (D2), and the inclined surface (711) is inclined such that a distance from the core (8) to the inclined surface (711) in the third direction (D3) increases as a distance from the core to the inclined surface (711) in the second direction (D2) decreases. According to this aspect, an impact that acts on the core (8) can be reduced.

In a second exemplary aspect, a dimension of each of the pair of side walls (71*a*, 71*b*) in the third direction (D3) is larger than a dimension of the core (8) in the third direction (D3). According to this aspect, projection of the core (8) from the side walls (71*a*, 71*b*) in the third direction (D3) can be suppressed, and contact between the core (8) and the winding (61) can be suppressed.

In a third exemplary aspect, at least one of the inner surfaces (710) of the pair of side walls (71*a*, 71*b*) includes a pair of inclined surfaces (711) that face each other in the third direction (D3) and one of which is the inclined surface (711). According to this aspect, projection of the core (8) from the side walls (71*a*, 71*b*) in the third direction (D3) can be suppressed, and contact between the core (8) and the winding (61) can be suppressed.

In a fourth exemplary aspect, at least one of the inner surfaces (710) of the pair of side walls (71*a*, 71*b*) includes a contact surface (712) that comes into contact with a side surface (82) of the core (8) in the second direction (D2). According to this aspect, movement of the core (8) in the second direction (D2) can be restricted.

In a fifth exemplary aspect, the contact surface (712) has a surface shape that enables the core (8) to move in the third direction (D3). According to this aspect, an impact acting on the core (8) can be released by the movement of the core (8) in the second direction (D2), so that the impact that acts on the core (8) can be reduced.

In a sixth exemplary aspect, a dimension of the contact surface (712) in the third direction (D3) is larger than a dimension of the side surface (82) of the core (8) in the third direction (D3). According to this aspect, the impact acting on the core (8) can be released by the movement of the core (8) in the second direction (D2), so that the impact that acts on the core (8) can be reduced.

In a seventh exemplary aspect, the at least one of the inner surfaces (710) of the pair of side walls (71*a*, 71*b*) includes a connection surface (713) that connects the contact surface (712) and the inclined surface (711) to each other. The angle of the connection surface (713) with respect to the third direction (D3) is greater than an angle of the inclined surface (711) with respect to the third direction (D3). According to this aspect, the inclined surface (711) and the core (8) can stably come into contact with each other.

In an eighth exemplary aspect, the core (8) includes a corner portion (81) that faces the inclined surface (711) in the third direction (D3). The corner portion (81) has a tapered shape or a rounded shape. According to this aspect, the inclined surface (711) and the core (8) can stably come into contact with each other.

In a ninth exemplary aspect, the bobbin (7) includes a pair of protrusions (76; 77) that protrude in the third direction (D3) from portions of the pair of side walls (71*a*, 71*b*), the portions being not surrounded by the winding (61). The pair of protrusions (76; 77) do not come into direct contact with the case (3). According to this aspect, an impact that is transmitted from the case (3) to the bobbin (7) can be reduced, and the impact that acts on the core (8) can be reduced.

In a tenth exemplary aspect, the bobbin (7) has an opening (761; 771) between the pair of protrusions (76; 77). According to this aspect, an impact will not be transmitted from the case (3) to a center portion of the core (8), and thus, the probability of breakage of the core (8) can be reduced.

In an eleventh exemplary aspect, the bobbin (7) includes a connection portion (78) that connects, from outside the pair of side walls (71*a*, 71*b*), portions of the pair of side walls (71*a*, 71*b*) that are not surrounded by the winding (61). A surface of the connection portion (78) that is located on a side opposite to a side on which the core (8) is located has a surface shape in which two end portions (782) project more than a center portion (781). According to this aspect, an impact will not be transmitted from the case (3) to the center portion of the core (8), and thus, the probability of breakage of the core (8) can be reduced.

In a twelfth exemplary aspect, the core (8) has a bar-like shape extending in the first direction (D1), and a dimension of the core (8) in the third direction (D3) is smaller than a dimension of the core (8) in the second direction (D2). According to this aspect, the impact in the third direction (D3) with which the strength of the core (8) becomes relatively weak can be reduced, and the probability of breakage of the core (8) can be reduced.

In a thirteenth exemplary aspect, an angle of the inclined surface (711) with respect to the third direction (D3) is greater than zero degree and less than or equal to 45 degrees. According to this aspect, a force that is applied to the core (8) due to an impact can be dispersed such that the force in the third direction (D3) is less than or equal to the force in the second direction (D2). Thus, an impact that acts on the core (8) can be reduced.

In a fourteenth exemplary aspect, a dimension of the inclined surface (711) in the first direction (D1) is larger than or equal to a dimension of the winding (61) in the first direction (D1). According to this aspect, the inclined surface (711) can suppress contact between the core (8) and the winding (61).

In a fifteenth exemplary aspect, the antenna device (1) further includes an elastic member (4) that is interposed between the antenna body (2) and the case (3) in the third direction (D3). According to this aspect, the impact that is transmitted from the case (3) to the bobbin (7) can be reduced, and the impact that acts on the core (8) can be reduced.

The exemplary embodiments have been described above as examples of the technique according to the present disclosure. The accompanying drawings and the detailed description have thus been provided. Accordingly, not only the components that are disclosed for solving the problem but additional components not necessarily required for solving the problem may be included in the components illustrated in the accompanying drawings and detailed description in order to illustrate the above-described technology. In addition, since the above-described embodiment is intended to illustrate the technology of the present disclosure, various changes, replacements, additions, omissions, and so forth can be made within the scope of claims and their equivalents.

REFERENCE SIGNS LIST

82 antenna device
2 antenna body
3 case
4 elastic member
61 winding
7 bobbin
71*a*, 71*b* side wall
710 inner surface
711 (711*a* to 711*d*) inclined surface
712 contact surface
713 (713*a* to 713*d*) connection surface
76 protrusion
761 opening
77 protrusion
771 opening
78 (78*a*, 78*b*) connection portion
781 center portion
782 two end portions
8 core
81 (81*a*, 81*b*) corner portion
82 (82*a*, 82*b*) side surface
D1 first direction
D2 second direction
D3 third direction

What is claimed:

1. An antenna device comprising:
a case;
an antenna body accommodated in the case and including:
a bobbin that extends in a first direction and includes a pair of side walls that have inner surfaces that face each other in a second direction that intersects the first direction,
a winding wound around the bobbin to collectively surround the pair of side walls, the winding having an axial direction that is parallel to the first direction, and
a core held by the pair of side walls in such a manner as to be located between the inner surfaces of the pair of side walls in an inner space defined by the winding,
wherein at least one of the inner surfaces of the pair of side walls includes an inclined surface, and
wherein the inclined surface overlaps the core in a third direction so as to be positioned closer to the core than the winding, with the third direction intersecting both the first direction and the second direction.

2. The antenna device according to claim 1, wherein the inclined surface is inclined such that a distance from the core to the inclined surface in the third direction increases as a distance from the core to the inclined surface in the second direction decreases.

3. The antenna device according to claim 1, wherein a dimension of each of the pair of side walls in the third direction is larger than a dimension of the core in the third direction.

4. The antenna device according to claim 1, wherein at least one of the inner surfaces of the pair of side walls includes a pair of inclined surfaces, which includes the inclined surface, that face each other in the third direction.

5. The antenna device according to claim 1, wherein at least one of the inner surfaces of the pair of side walls includes a contact surface configured to contact a side surface of the core in the second direction.

6. The antenna device according to claim 5, wherein the contact surface has a surface shape that configures the core to move in the third direction.

7. The antenna device according to claim 6, wherein a dimension of the contact surface in the third direction is larger than a dimension of the side surface of the core in the third direction.

8. The antenna device according to claim 5, wherein the at least one of the inner surfaces of the pair of side walls includes a connection surface that connects the contact surface to the inclined surface.

9. The antenna device according to claim 8, wherein the connection surface extends at an angle with respect to the third direction that is greater than an angle of the inclined surface with respect to the third direction.

10. The antenna device according to claim 1, wherein the core includes a corner portion that faces the inclined surface in the third direction.

11. The antenna device according to claim 10, wherein the corner portion has one of a tapered shape and a rounded shape.

12. The antenna device according to claim 1, wherein the bobbin includes a pair of protrusions that protrude in the third direction from portions of the pair of side walls that are not surrounded by the winding, and wherein the pair of protrusions do not directly contact the case.

13. The antenna device according to claim 12, wherein the bobbin has an opening between the pair of protrusions.

14. The antenna device according to claim 1, wherein the bobbin includes a connection portion that connects, from outside the pair of side walls, portions of the pair of side walls that are not surrounded by the winding.

15. The antenna device according to claim 14, wherein the connection portion comprises a surface that is located on a side opposite to a side on which the core is located and has a surface shape in which two end portions project more than a center portion.

16. The antenna device according to claim 1, wherein the core has a bar-like shape that extends in the first direction, and a dimension in the third direction that is smaller than a dimension of the core in the second direction.

17. The antenna device according to claim 16, wherein the inclined surface extends at an angle with respect to the third direction that is greater than zero degree and less than or equal to 45 degrees.

18. The antenna device according to claim 1, wherein the inclined surface has a dimension in the first direction that is larger than or equal to a dimension of the winding in the first direction.

19. The antenna device according to claim 1, further comprising an elastic member that is interposed between the antenna body and the case in the third direction.

20. An antenna body comprising:

a bobbin that extends in a first direction and includes a pair of side walls that have inner surfaces that face each other in a second direction that intersects the first direction;

a winding wound around the bobbin to collectively surround the pair of side walls, the winding having an axial direction that is parallel to the first direction; and a core held by the pair of side walls in such a manner as to be located between the inner surfaces of the pair of side walls in an inner space defined by the winding, wherein at least one of the inner surfaces of the pair of side walls includes an inclined surface that overlaps the core in a third direction so as to be positioned closer to the core than the winding, with the third direction intersecting both the first direction and the second direction.

* * * * *